United States Patent
Luzzato et al.

(10) Patent No.: US 11,565,969 B2
(45) Date of Patent: Jan. 31, 2023

(54) ASYMMETRIC CHEMICAL STRENGTHENING

(71) Applicant: Apple Inc., Cupertino, CA (US)

(72) Inventors: Victor Luzzato, Santa Clara, CA (US); Christopher D. Prest, San Francisco, CA (US); Dale N. Memering, Langhome, PA (US); Matthew S. Rogers, San Jose, CA (US)

(73) Assignee: APPLE INC., Cupertino, CA (US)

( * ) Notice: Subject to any disclaimer, the term of this patent is extended or adjusted under 35 U.S.C. 154(b) by 134 days.

(21) Appl. No.: 17/155,861

(22) Filed: Jan. 22, 2021

(65) Prior Publication Data

US 2021/0139371 A1 May 13, 2021

Related U.S. Application Data

(63) Continuation of application No. 16/143,119, filed on Sep. 26, 2018, now Pat. No. 10,899,660, which is a continuation-in-part of application No. 15/600,204, filed on May 19, 2017, now Pat. No. 11,247,937.

(60) Provisional application No. 62/645,789, filed on Mar. 20, 2018, provisional application No. 62/368,792, filed on Jul. 29, 2016, provisional application No. 62/368,787, filed on Jul. 29, 2016, provisional application No. 62/362,578, filed on Jul. 14, 2016, provisional application No. 62/339,062, filed on May 19, 2016.

(51) Int. Cl.
*C03C 21/00* (2006.01)

(52) U.S. Cl.
CPC .................. *C03C 21/002* (2013.01)

(58) Field of Classification Search
None
See application file for complete search history.

(56) References Cited

U.S. PATENT DOCUMENTS

| 3,287,200 | A | 11/1966 | Hess et al. |
| 8,652,639 | B2 | 2/2014 | Chu et al. |
| 9,187,358 | B2 | 11/2015 | Luo et al. |
| 9,221,715 | B2 | 12/2015 | Rogers et al. |

(Continued)

FOREIGN PATENT DOCUMENTS

| CN | 1491911 | 4/2004 |
| CN | 102131740 | 7/2011 |

(Continued)

OTHER PUBLICATIONS

International Search Report and Written Opinion, PCT/US2017/033551, 16 pages, dated Jul. 28, 2017.

*Primary Examiner* — David Sample
(74) *Attorney, Agent, or Firm* — Brownstein Hyatt Farber Schreck, LLP

(57) ABSTRACT

Asymmetrically strengthened glass articles, methods for producing the same, and use of the articles in portable electronic device is disclosed. The asymmetrically strengthened glass articles include glass articles having a deeper compressive stress layer in a thicker portion of the glass article. Using a budgeted amount of compressive stress and tensile stress, asymmetric chemical strengthening is optimized for the utility of a glass article. In some aspects, the strengthened glass article can be designed for reduced damage, or damage propagation, when dropped.

20 Claims, 39 Drawing Sheets

(56) References Cited

U.S. PATENT DOCUMENTS

| | | |
|---|---|---|
| 9,292,634 B2 | 3/2016 | Ahmed et al. |
| 9,725,359 B2 | 8/2017 | Weber |
| 9,790,128 B2 | 10/2017 | Garner et al. |
| 9,886,062 B2 | 2/2018 | Qian et al. |
| 9,946,302 B2 | 4/2018 | Franklin et al. |
| 10,071,933 B2 | 9/2018 | Wang et al. |
| 10,206,298 B2 | 2/2019 | Memering et al. |
| 10,899,660 B2 * | 1/2021 | Luzzato ................ C03C 21/002 |
| 11,247,937 B2 * | 2/2022 | Luzzato ................ C03C 21/00 |
| 2005/0184637 A1 | 8/2005 | Sugawara et al. |
| 2010/0285260 A1 | 11/2010 | Bookbinder et al. |
| 2011/0019123 A1 | 1/2011 | Prest et al. |
| 2011/0154861 A1 | 6/2011 | Kishimoto et al. |
| 2012/0194974 A1 | 8/2012 | Weber et al. |
| 2012/0236526 A1 * | 9/2012 | Weber ................ C03C 21/002 65/30.14 |
| 2013/0122254 A1 | 3/2013 | Liang |
| 2013/0122260 A1 | 5/2013 | Liang |
| 2014/0034374 A1 | 2/2014 | Cornejo et al. |
| 2014/0078412 A1 * | 3/2014 | Franklin ................ C03C 17/002 349/12 |
| 2014/0162029 A1 | 6/2014 | Takeuchi et al. |
| 2014/0370244 A1 | 12/2014 | Kinoshita et al. |
| 2015/0044445 A1 | 2/2015 | Garner et al. |
| 2015/0274585 A1 | 10/2015 | Rogers et al. |
| 2017/0334769 A1 | 11/2017 | Luzzato et al. |
| 2017/0334770 A1 | 11/2017 | Luzzato et al. |
| 2018/0016188 A1 | 1/2018 | Gamer et al. |
| 2019/0023611 A1 | 1/2019 | Luzzato et al. |
| 2019/0161401 A1 | 5/2019 | Kuang et al. |
| 2019/0330103 A1 | 10/2019 | Ozeki et al. |

FOREIGN PATENT DOCUMENTS

| | | | | |
|---|---|---|---|---|
| CN | 102388003 | 3/2012 | | |
| CN | 102421597 | 4/2012 | | |
| CN | 102557467 | 7/2012 | | |
| CN | 102612500 | 7/2012 | | |
| CN | 103261112 | 8/2013 | | |
| CN | 103391903 | 11/2013 | | |
| CN | 103476727 | 12/2013 | | |
| CN | 103748047 | 4/2014 | | |
| CN | 104144877 | 11/2014 | | |
| CN | 105683118 | 6/2016 | | |
| CN | 105873871 | 8/2016 | | |
| CN | 106061913 | 10/2016 | | |
| CN | 106164004 | 11/2016 | | |
| CN | 106380087 | 2/2017 | | |
| CN | 106673458 | 5/2017 | | |
| CN | 107117810 | 9/2017 | | |
| DE | 102012213071 | 7/2013 | | |
| JP | 2000233949 | 8/2000 | | |
| JP | 2004510012 | 4/2004 | | |
| JP | 2005298312 | 10/2005 | | |
| JP | 2009234856 | 10/2009 | | |
| JP | 2014510012 | 4/2014 | | |
| JP | 2015006959 | 1/2015 | | |
| JP | 2017030997 | 2/2017 | | |
| JP | 2018168030 | 11/2018 | | |
| KR | 20170033209 A | * | 3/2017 | ............ C03C 21/00 |
| TW | 201819327 | 6/2018 | | |
| WO | WO2013/088910 | 6/2013 | | |
| WO | WO2015/031151 | 3/2015 | | |
| WO | WO2015/057552 | 4/2015 | | |
| WO | WO2015130494 | 9/2015 | | |
| WO | WO2015/146169 | 10/2015 | | |
| WO | WO2016/149860 | 9/2016 | | |
| WO | WO2017/026190 | 2/2017 | | |
| WO | WO-2018066314 A1 | * | 4/2018 | ........... C03C 17/245 |

* cited by examiner

ASYMMETRIC CHEMICAL STRENGTHENING

CROSS-REFERENCE TO RELATED APPLICATION(S)

This application is a continuation patent application of U.S. patent application Ser. No. 16/143,119, filed Sep. 26, 2018 and titled "Asymmetric Chemical Strengthening," now U.S. Pat. No. 10,899,660, which claims the benefit of U.S. Provisional Patent Application No. 62/645,789, filed Mar. 20, 2018 and titled "Asymmetric Chemical Strengthening" and this application is a continuation-in-part patent application of U.S. patent application Ser. No. 15/600,204, filed May 19, 2017 and titled "Asymmetric Chemical Strengthening," now U.S. Pat. No. 11,247,937, which claims the benefit of U.S. Provisional Patent Application No. 62/339,062, filed May 19, 2016 and titled "Asymmetric Chemical Strengthening," U.S. Provisional Patent Application No. 62/362,578, filed Jul. 14, 2016 and titled "Asymmetric Chemical Strengthening," U.S. Provisional Patent Application No. 62/368,787, filed Jul. 29, 2016 and titled "Asymmetric Chemical Strengthening," and U.S. Provisional Patent Application No. 62/368,792, filed Jul. 29, 2016 and titled "Asymmetric Chemical Strengthening," the disclosures of which are hereby incorporated herein by reference in their entireties.

FIELD

The described embodiments relate generally to asymmetric chemical strengthening of a glass article. More particularly, the present embodiments relate to calibrating the strength and safety of a cover glass for use in a portable electronic device.

BACKGROUND

The cover window and display for small form factor devices are typically made of glass. Glass, although transparent and scratch resistant, is brittle and prone to impact failure. Providing a reasonable level of strength in these glass parts is crucial to reducing the likelihood of glass part failure, and hence device failure.

Chemical strengthening has been used to increase the strength of glass parts. Typical chemical strengthening relies on a uniform and symmetric increase of the compression stress over the entire surface of the glass part. Such strengthening processes have proven effective at reducing some level of failure in glass parts. However, there continues to be significant pressure on forming thinner glass for use in small form factor devices, where symmetric chemical strengthening is insufficient to prevent impact failure in a reliable fashion.

As such, while conventional chemical strengthening is effective, there is a continuing need to provide improved and alternative ways to strengthen glass, particularly, thin glass.

SUMMARY

Various embodiments described herein encompass asymmetrically strengthened glass articles. Asymmetrically strengthened glass articles can have enhanced reliability and safety as compared to symmetrically strengthened glass articles. In embodiments, an asymmetrically strengthened glass article has a first zone with a first stress pattern, and a second zone with a second stress pattern. The first stress pattern and second stress pattern differ from one another. The differences in the first stress pattern and second stress pattern can result in a stress imbalance in the asymmetrically strengthened glass article.

In aspects of the disclosure, the glass article is asymmetrically chemically strengthened through an ion exchange process. In embodiments, the ion exchange process introduces a compressive stress layer (i.e., a residual compressive stress layer) along one or more surfaces of the glass article. Asymmetric chemical strengthening can occur when the compressive stress layer differs along the surfaces of the glass article. For example, a depth of the compressive stress layer at a front surface of the glass article may be greater than a depth of the compressive layer at a rear surface of the glass article. In this case, the front surface of the glass article may more durable and impact resistant than the bottom surface. In addition, although the inclusion of additional compressive stress on the front surface may tend to cause an increase in the tensile stress within the glass article, this increase in tensile stress may be compensated for by the shallower depth of compression on the rear surface.

In additional aspects, the glass article includes a thicker portion and a thinner portion, each of which is strengthened differently. In embodiments, the glass article includes a peripheral portion which is thicker than a central portion of the glass article. The greater thickness of the peripheral region may allow a greater extent of chemical strengthening in this region without creating undesirable levels of tensile stress in the glass article.

In embodiments, a depth of the compressive stress layer is greater in the thicker peripheral portion than in the thinner central portion. This pattern of asymmetric chemical strengthening allows a surface of the peripheral region to be more resistant to impact than a surface of the central portion. In further embodiments, different surfaces of the peripheral portion and/or the central portion may be asymmetrically strengthened. For example, the depth and/or the surface compressive stress may differ between the front and the rear surface of a portion of the glass article.

In additional embodiments, a glass article for an electronic device comprises a first portion having a first thickness and a second portion having a second thickness greater than the first thickness. A central zone of the electronic device may define the first portion and the second portion. The electronic device may further comprise a peripheral zone contiguous with and at least partially surrounding the central zone. The peripheral portion may have a third thickness greater than the first thickness. The third thickness may also be greater than the second thickness.

As previously discussed, the glass article may be asymmetrically chemically strengthened. For example, the compressive stress layer may be deeper at an exterior surface of the thicker first portion as compared to an exterior surface of the thinner first portion. Further, the glass article may be asymmetrically chemically strengthened so that the compressive stress layer in a given portion of the glass article is deeper at the exterior surface than at an interior surface.

For example, a thinner central zone may be asymmetrically chemically strengthened to include a first compressive stress region extending from a central exterior surface to a first depth; and a second compressive stress region extending from a central interior surface to a second depth. The second depth may be less than the first depth. As an additional example, a thicker peripheral zone may be asymmetrically chemically strengthened to include a third compressive stress region extending from a peripheral exterior surface to a third depth greater than the first depth; and a fourth compressive stress region extending from the peripheral interior surface to a fourth depth less than the third depth. The central zone may have a first thickness and the peripheral zone may have a second thickness and at least partially surround the central zone.

As an additional example, the glass article includes a thinner first portion and a thicker second portion and the glass article may be asymmetrically chemically strengthened so that the compressive stress layer is deeper at a front and/or a rear surface of the thicker second portion as compared to a front surface of the thinner first portion. The glass article may also be asymmetrically chemically strengthened so that the compressive stress layer of at least one of the first portion and the second portion is deeper at the front surface as compared to the rear surface. In embodiments, a central zone of the glass article defines the first portion and the second portion.

As an example, the first portion has a first thickness and comprises a first front surface and a first rear surface. The second portion has a second thickness greater than the first thickness, is contiguous with the first portion, and comprises a second front surface and a second rear surface. The second portion may also comprise a first wall surface adjoining the first rear surface and the second rear surface.

The first portion further comprises a first compressive stress region having a first depth along the first front surface; and a second compressive stress region having a second depth, less than the first depth, along the first rear surface. The second portion further comprises a third compressive stress region having a third depth along the second front surface; and a fourth compressive stress region having a fourth depth along the second rear surface, at least one of the third depth and the fourth depth being greater than the first depth. In embodiments, the first rear depth is about equal to the second rear depth.

In embodiments, a peripheral zone at least partially surrounds the central zone and the peripheral zone comprises a third front surface and a third rear surface. The peripheral zone may also comprise a second wall surface adjoining the third rear surface and the first rear surface. In addition, the peripheral zone may further comprise a third wall surface adjoining the third rear surface and the second rear surface. The peripheral zone further comprises a fifth compressive stress region having a fifth depth along the third front surface; and a sixth compressive stress region having a sixth depth along the third rear surface, at least one of the fifth depth and the sixth depth being greater than the first depth.

Various embodiments described herein also encompass an asymmetrically strengthened cover glass for use with an electronic device, where the cover glass is designed to reduce or limit damage resulting from an impact, for example, a drop.

In additional embodiments, the cover glass includes three different stress patterns resulting from asymmetric strengthening, a first stress pattern corresponding to corner zones of the cover glass, a second stress pattern corresponding to straight edge(s) or straight perimeter zones of the cover glass, and a third stress pattern corresponding to the remainder or center zone of the cover glass. The first zone has been strengthened the most, the second zone to a lesser extent than the first zone, and the third zone the least, as compared to the first and second zones. In order to maintain a stress budget that corresponds to a useful cover glass for an electronic device, all of the stress budget is typically spent on the first and second zones, allowing little or no strengthening of the third zone. This pattern of asymmetric strengthening causes the corners, where most impacts occur, to be most strengthened and resistant to impact, the second zone having adequate strengthening for impact protection, and the third zone to remain substantially flat.

Embodiments also include portable electronic devices that include glass articles in accordance with the disclosure, as well as to methods of manufacturing the same portable electronic devices. In some aspects, the glass articles can undergo monitoring and testing to identify conforming asymmetrically strengthened glass articles for use in electronic devices.

In method embodiments, a glass article is asymmetrically strengthened to calibrate the glass for use in a portable electronic device. The glass article can be calibrated to have a target geometry or provide one or more flat surfaces.

In aspects, the disclosure provides a method for manufacturing a glass article, comprising forming a compressive stress layer through at least one ion exchange along surfaces of the glass article. The compressive stress layer comprises regions of different depths in different portions of the glass article. The glass article may comprise a thinner central portion and a thicker peripheral portion and the compressive stress layer may be formed along the central portion and the peripheral portion.

An example compressive stress layer comprises a first compressive stress region having a first depth along a central exterior surface of the glass article and a second compressive stress region having a second depth along a central interior surface of the glass article. The second depth may be less than the first depth. The compressive stress layer further comprises a third compressive stress region having a third depth, greater than the first depth, along a peripheral exterior surface of the glass article, the peripheral portion having a thickness greater than a thickness of the central portion; and a fourth compressive stress region having a fourth depth, less than the third depth, along a peripheral interior surface of the article. The formation of the compressive stress layer produces a region of a tensile stress within the glass article to balance the compressive stress layer.

Typically multiple ion exchanges (alternately, ion exchange operations) are used to form a compressive stress layer including multiple compressive stress regions. As an example, each of the compressive stress regions may be formed in a separate ion exchange operation. As another example, at least one compressive stress region may be formed during multiple ion exchange operations. The operation of forming a compressive stress layer having regions of different depths generally includes at least one operation of applying a mask to the glass article.

Some methods of asymmetric strengthening include immersing an ion exchangeable glass in a bath comprising the ions to be exchanged for smaller ions in the glass article. An example method may comprise immersing a sodium-infused glass article in a potassium ion bath, while preferentially transporting the potassium ions at a predetermined surface of the glass article. In some aspects the immersing of the sodium-infused glass article in the potassium ion bath is accompanied by submitting microwave radiation to the same predetermined surface of the glass article. In methods including multiple ion exchange operations, the different baths may have different concentrations of the ions to be introduced into the glass article.

In additional method embodiments, a stress relationship is identified and implemented using chemical strengthening. In some aspects, glass forming is combined with asymmetric chemical strengthening to provide a glass article having an appropriate geometry.

BRIEF DESCRIPTION OF THE DRAWINGS

The disclosure will be readily understood by the following detailed description in conjunction with the accompanying drawings, wherein like reference numerals designate like structural elements, and in which.

Figure 1:
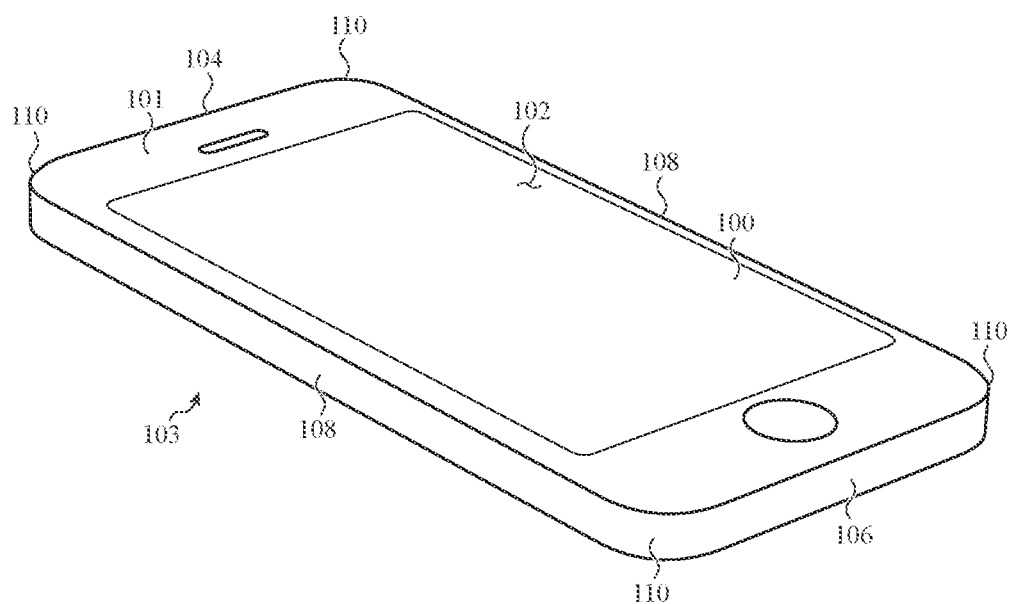
FIG. 1 shows a diagram of a glass article in accordance with embodiments herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, they are intended to cover alternatives, modifications, and equivalents as can be included within the spirit and scope of the described embodiments as defined by the appended claims.

The following disclosure relates to glass articles, methods of producing glass articles, and to the utility of such glass articles in an electronic device. The glass article may be a glass component of an electronic device. Embodiments also relate to the asymmetric increase in the strength of glass, especially related to asymmetrically strengthening a glass article to further calibrate the reliability and safety of the glass article in an electronic device. In some embodiments the electronic device can include a housing, a display positioned at least partially within the housing and a glass article, for example a cover glass, in accordance with embodiments herein.

In one example, the glass article may be an outer surface of an electronic device. The glass article may correspond to a glass article that helps form part of a display area or, in some instances, be involved in forming part of the housing. The embodiments herein are particularly relevant for use in portable electronic devices and small form factor electronic devices, e.g., laptops, mobile phones, media players, remote control units, and the like. Typical glass articles herein are thin, and typically less than 5 mm in thickness, and in most cases are between about 0.3 and 3 mm, and between 0.3 and 2.5 mm, in thickness.

These and other embodiments are discussed below with reference to FIGS. 1-34B. However, those skilled in the art will readily appreciate that the detailed description given herein with respect to these figures is for explanatory purposes only and should not be construed as limiting.

FIG. 1 is a perspective diagram of a glass article in accordance with one embodiment. The glass article 100 is a thin sheet of glass with a length and width consistent with the application. In one application as shown in FIG. 1, the glass article is a cover glass for a housing of an electronic device 103. In embodiments, the various surfaces of the glass article may be referenced with respect to their orientation in an electronic device. For example, the glass article may have a surface which faces an exterior of the electronic device. This surface may also form an external surface of the electronic device. This surface may be referred to as an exterior surface or as an outer surface. The exterior surface may include a front surface of glass article. Similarly, the glass article may have a surface which faces an interior of the electronic device. This surface may be referred to as an interior surface or an inner surface. The interior surface may include a back or rear surface of the glass article. The terms "interior," "exterior," "front", and "rear" are used to identify surfaces of the glass article relative to the electronic device; the orientation of the apparatus is not intended to limited by the use of these terms. Some glass articles may also include at least one side surface between the interior surface and the exterior surface. A periphery of the glass article may be defined at least in part by the at least one side surface.

As illustrated in FIG. 1, the glass article 100 can have a front surface 102, back surface (not shown), top surface 104, bottom surface 106, and side surfaces 108, and edges 110. Alternately, the top surface 104 and the bottom surface 106 may simply be referred to as side surfaces. As shown, an edge 110 may provide a transition between surfaces at the periphery of the glass article (e.g. between surface 106 and surface 108). As discussed in more detail below, the edges 110 of the glass article 100 can have predetermined geometries. The various surfaces and sides can be composed of zones and/or portions. For example, a glass article may comprise a peripheral zone and a central zone. The peripheral zone (or peripheral portion) may include a peripheral region of the external surface and a peripheral region of the internal surface. The peripheral zone may further include the side surfaces of the glass article. The peripheral zone may form a boundary around at least a portion of the central zone (also central portion or center portion).

As another example, one zone of a glass article could be the entire front surface, while the back surface would be considered a different zone, for example. Another zone of a glass article could be an area corresponding to one or more corners of the glass. A zone does not have to be continuous, for example all four corners of the glass article may be representative on a single zone. The strength requirements for the surfaces and zones may differ on the use, for example, a front surface 102, exposed to the outside environment, may require a different strength than the back surface, enclosed away from the environment.

These and other embodiments are discussed below with reference to FIGS. 2-30. However, those skilled in the art will readily appreciate that the detailed description given herein with respect to these Figures is for explanatory purposes only and should not be construed as limiting.

Chemical Strengthening

Embodiments herein may utilize a glass strengthening process where a glass article is first enhanced by immersion in a first ion solution (sodium, for example) and then strengthened by immersion in a second ion solution (potassium, for example).

Figure 2:
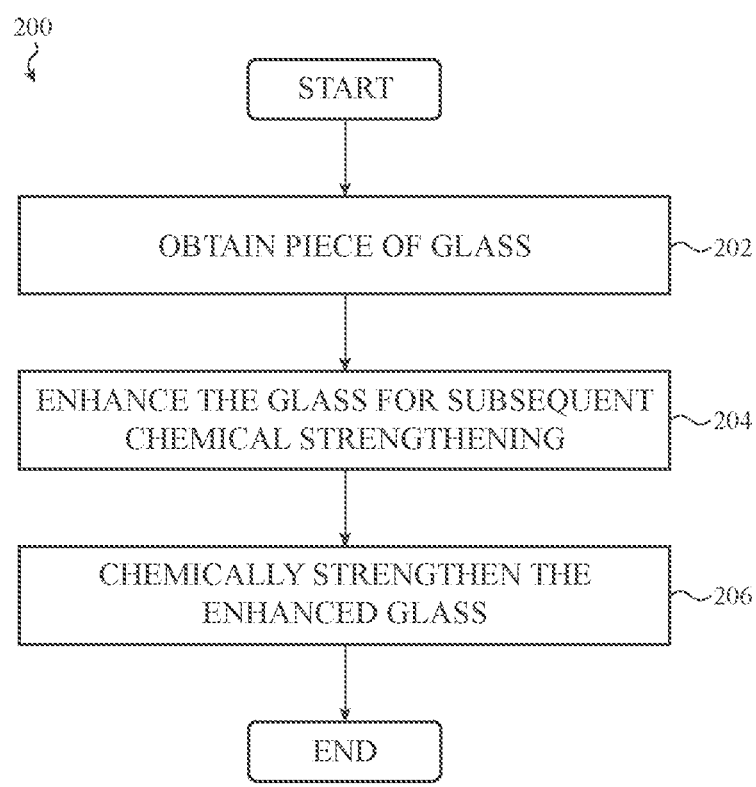
FIG. 2 is a flow diagram of a glass strengthening process in accordance with embodiments herein.

FIG. 2 is a flow diagram of a glass strengthening process 200 according to one embodiment. The glass strengthening process 200 includes obtaining a piece of glass 202, enhancing the glass article through chemical processing 204, and strengthening the glass article through further chemical processing 206.

Figure 3:
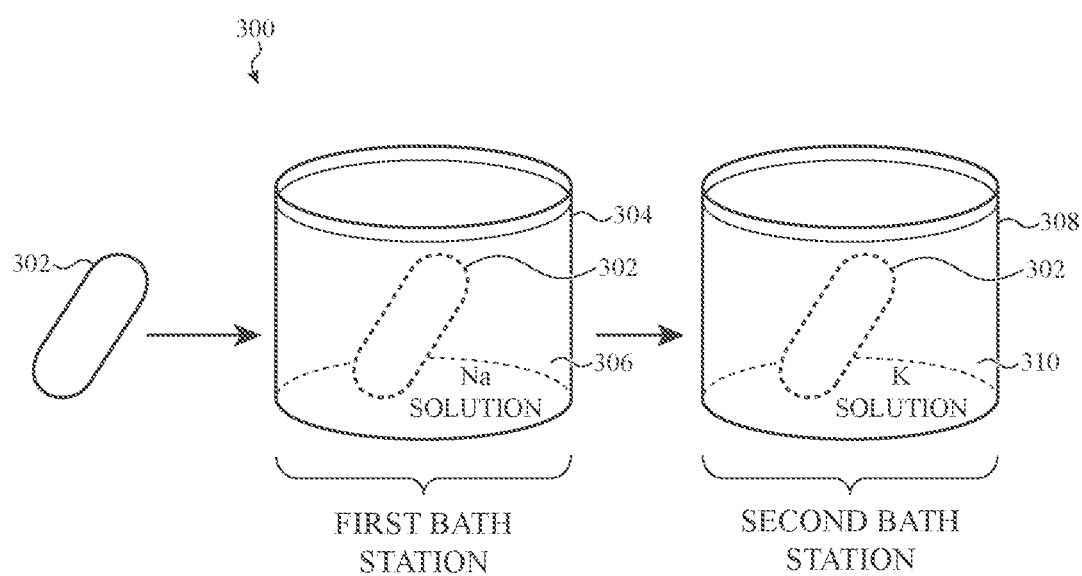
FIG. 3 shows a glass strengthening system in accordance with embodiments herein.

FIG. 3 illustrates one embodiment for strengthening a glass article in accordance with embodiments herein 300. A glass article 302 in need of glass strengthening is immersed in a first bath 304 that contains a sodium solution 306. The enhanced strength glass article is then removed from the first bath 304 and immersed in a second bath 308 that contains a potassium solution 310. At this stage, the glass article 302 is symmetrically strengthened, meaning that all exposed surfaces of the glass article have been equally enhanced and strengthened through the immersion in the sodium and then potassium solutions. In some embodiments, the strengthened glass article can be quenched to eliminate further exchange of ions from the treated glass article.

The level of glass article enhancement is generally controlled by the type of glass (glass articles can, for example, be alumina silicate glass or soda lime glass, and the like); the sodium concentration of the bath (sodium or sodium nitrate, typically 30%-100% mol); the time the glass article spends in the bath (typically 4-8 hours); and temperature of the bath (350-450° C.).

Strengthening of the glass article in the second bath is controlled by the type of glass, the potassium ion concentration, the time the glass spends in the solution, and the temperature of the solution. Here, the potassium or potassium nitrate is in the range of 30-100% mol, but the glass article would remain in the bath for about 6-20 hours at a solution temperature of between about 300-500° C.

The chemical strengthening process relies upon ion exchange. In each solution bath the ions therein are heated to facilitate ion exchange with the glass article. During a typical ion exchange, a diffusion exchange occurs between the glass article and the ion bath. For example, sodium ions in the enhancement process diffuse into the surface of the exposed glass, allowing a build-up of sodium ions in the surface of the glass by replacement of other ions found in a silicate or soda lime glass. Upon immersion of the enhanced glass article into the potassium bath, the sodium ions are replaced by potassium ions in surface areas to a greater extent than sodium ions found more toward the interior or middle of the glass. As a result, the potassium ions introduced into the glass to replace the sodium ions form a compression layer near the surface of the glass article (essentially the larger potassium ions take up more space than the exchanged smaller sodium ions). The sodium ions that have been displaced from the surface of the glass article become part of the potassium bath ion solution. Depending on the factors already discussed above, a compression layer as deep as about 10-100 microns, and more typically 10-75 microns, can be formed in the glass article. The surface compressive stress (CS) may be from about 300 MPa to about 1100 MPa.

Figure 4A:
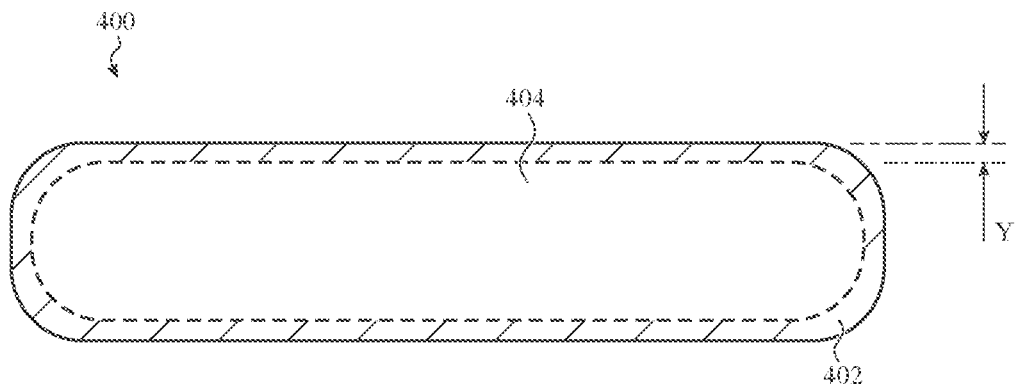
FIG. 4A is a cross-sectional diagram of a glass cover which has been symmetrically chemically treated in accordance with embodiments herein.

FIG. 4A is a cross-sectional diagram of a glass article 400 which has been chemically treated such that a symmetrical chemically strengthened layer 402 is created according to embodiments described herein. The glass article 400 includes a chemically strengthened layer 402 and a non-chemically strengthened inner portion 404. While discussed in greater detail throughout, the effect of chemically strengthening the glass article is that the inner portion 404 is under tension, while the chemically strengthened layer 402 is in compression. The chemically strengthened layer has a thickness (Y) which may vary depending upon the requirements of a particular use.

Figure 4B:
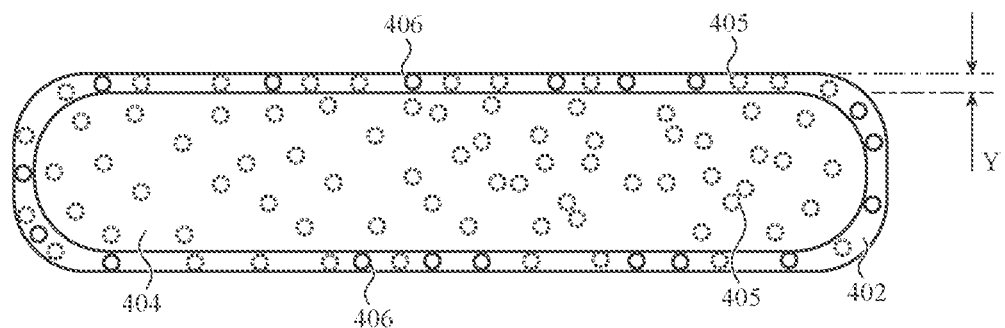
FIG. 4B is a cross-sectional diagram of a glass cover which has been symmetrically chemically treated, as shown to include a chemically treated portion in which potassium ions have been implanted in accordance with embodiments herein.

FIG. 4B is a diagrammatic representation of a chemically strengthened process. Note that some amount of sodium 405 diffuses from the enhanced glass article to the ion bath, while potassium (K) ions 406 diffuse into the surface of the glass article, forming the chemically strengthened layer 402. Alkali metal ions like potassium, however, are generally too large to diffused into the center portion of the glass, thereby leaving the interior portion 404 only under tension and not in compression. By controlling the duration of the treatments, temperature of the treatments, and the concentration of the various ions involved in the treatments, the thickness (Y) of a strengthening compression layer 402 may be controlled, as well as the concentration of ions in the compression layer. Note that the concentration of the ions involved in the chemically strengthening process may be controlled by maintaining, during glass article treatment, a substantially constant amount of ion in each of the two baths (for example, as the potassium ions diffuse into the glass, a controller would add more potassium ions into the ion bath—thereby encouraging the potassium to continue to diffuse into the glass). The relationship between the chemically strengthened compression level (both ion concentration at the surface and depth) and inner tension portion forms a stress pattern for a chemically treated glass article.

Additional ion bath immersions may be added to the basic glass chemical strengthening process. For example, a third bath including sodium or sodium nitrate can be used to immerse the strengthened glass so as to exchange potassium ions out of the compression layer for sodium ions in the third bath. This is referred to as a back-exchange or toughening process. The toughening process is used to further control the depth and strength of a compression layer, and in particular, to remove some compression stresses from near the top surface regions, while allowing the underlying potassium ions to remain in the lower regions of the compression layer. In addition, the toughening process reduces the central tension from the glass article (see below).

Although sodium enhancement and potassium strengthening is described herein, other ion combinations are within the scope of the present disclosure, for example, use of lithium instead of sodium, or cesium instead of potassium, e.g., sodium-potassium, sodium-cesium, lithium-potassium, lithium-cesium treatment combinations. Any ion combination can be used herein that provides an increase in the glass article surface compression and compression depth.

Chemical strengthening is applied to glass surfaces, and relies upon exposure of the glass surface to the chemical strengthening process. Where a glass article is immersed such that all aspects of the article have equal exposure to the ion bath, the glass article surface will be symmetrically strengthened, allowing for a glass article with a uniformly thick and composed compression layer (Y). As embodiments herein will show, where a glass article surface is not equally exposed to chemical strengthening, the surface will be asymmetrically strengthened, allowing for a glass article with a non-uniform compression layer. As above, asymmetrically strengthened glass articles have a stress pattern; however, the stress pattern is modified based on the asymmetry of the chemical treatment.

Pre-Heating to Increase Glass Density Prior to Chemical Strengthening

Chemical strengthening may be enhanced or facilitated by various thermal techniques that are performed prior to the chemical strengthening process. Chemical strengthening is limited by the saturation limit of the glass for an amount or volume of ions. The size, depth and concentration of ions within a glass article directly relates to the characteristic strengthening for that glass, which as described herein, can be modified and calibrated throughout the glass to optimize the glass for a particular use.

At saturation, no additional compression layer or depth modifications may be accomplished (via diffusion). However, modification of thermal input to a glass article, prior to chemical strengthening, can allow for enhancement of the glass surface density, which will directly contribute to the concentration and depth of the strengthened compression layer.

Where a significant amount of thermal energy is added to a glass article prior to chemical strengthening, the glass density of the article can be increased. Glass density in these embodiments results in the glass lattice being heated to a point of densification.

Figure 5A:
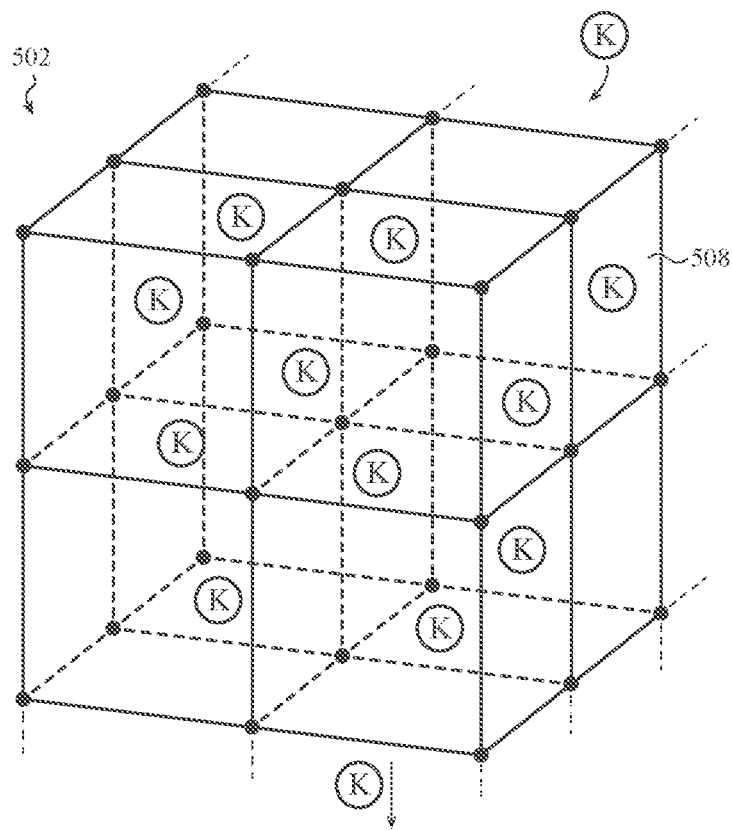
FIG. 5A is a diagram of a lattice structure for glass.
Figure 5B:
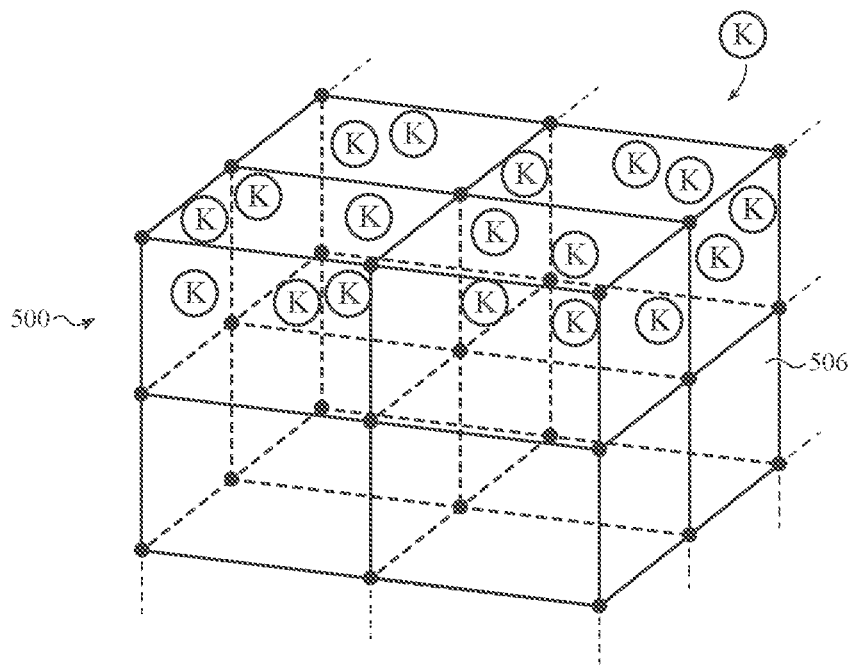
FIG. 5B is a diagram of a lattice structure for corresponding densified glass.

As shown in FIG. 5A and FIG. 5B, denser glass (5B) 500 provides a more limited lattice structure (more restricted and less flexible) and is less able to undergo ion diffusion to deeper levels than non-treated glass (5A) 502.

In FIGS. 5A and 5B, the glass has a starting glass lattice structure 502, which when heated to a densification temperature, is densified and provides a smaller volume 506 for ions to move through than the volume 508 of the non-densified glass 502. In an embodiment, the lattice structure is a network structure, such as a silicate-based network structure. For example, an aluminosilicate glass may have an aluminosilicate network structure. The restriction on the glass lattice allows for fewer ions to diffuse inwardly, while the concentration of ions in the chemical strengthening bath remains high (as compared to an ion bath used for non-densified glass). Also, although the glass lattice has been densified, embodiments herein do not result in thermal input to the point of crystal lattice collapse (not shown), rather heat is applied to the point of lattice limitation, some ions are able to diffuse into the glass. The ions that do diffuse into the glass are tightly packed at the surface of the densified glass and thereby provide a superior surface compression layer of shallow depth.

As such, the increase in glass density at the start of the chemical strengthening process limits ion diffusion into the glass surface, allowing the glass to exchange a greater amount of ions at the surface of the glass, but only allowing the exchange to a shallow depth. Glass articles treated prior to chemical strengthening by initial thermal input typically express a higher chemical stress at the surface, but to a shallower depth. These glass articles are most useful for high compressive stress but to a shallow depth, e.g., an article where polishing or other like procedure is likely required on the chemically strengthened glass, or where the glass may be exposed to increased risk of scratching but not wear and tear (impact).

One such thermal technique is annealing a glass article prior to chemical strengthening. Annealing includes subjecting the glass article to a relatively high temperature in an annealing environment for a predetermined amount of time, and then subjecting the glass article to a controlled cooling for a second predetermined amount of time. Once annealed and chemically strengthened, the glass article will have a modified compressive stress as compared to similar glass articles not annealed prior to chemical strengthening. As noted above, annealing is particularly important where the glass article is in need of high surface compressive stress (but to a shallower depth).

The annealing process requires that the glass article be heated to a temperature between the glass's strain point temperature and softening temperature, also known as the glass's annealing temperature (for aluminosilicate glass the annealing temperature is between about 540-550° C.). The time required to anneal a glass article varies, but is typically between 1-4 hours, and cooling times typically are on the order of ½° C./min for up to about 5 hours.

Typically, glass articles that have been annealed may be taken straight from a controlled cooling, and immersed in the enhancement ion bath (sodium), or, alternatively, the article may be further air cooled, and then immersed in the first ion bath. Once annealed, the glass will resist deeper ion diffusion but allow some diffusion at the surface. The diffusion into the surface allows for high compression stress (with shallow depth).

A second thermal technique used to raise a glass article's density prior to chemical strengthening is hot isostatic pressing or HIP. HIP includes simultaneously subjecting the glass article to heat and pressure for a predetermined amount of time in an inert gas. The glass article is allowed to remain in the HIP pressure vessel until the glass article is denser, where internal voids in the glass are limited. As for annealing, the increase in glass density prior to chemical strengthening by HIP allows for the production of a higher compression stress at the glass article surface, but to a shallower depth (than would be expected for a glass article that does not undergo HIP).

HIP parameters vary, but an illustrative process would involve placing the glass article to be chemically strengthened in a HIP pressure vessel, drawing a vacuum on the vessel, and applying heat to the glass article in the vessel. Under pressure, the vessel may be heated to 600-1,450° C., depending on the type and thickness of the glass. Heat and pressure are typically maintained for about 10-20 minutes, after which the processed glass is allowed to cool. In some embodiments, a suitable inert gas can be introduced in the vessel to facilitate heating of the glass article. HIP is another tool for modifying or enhancing the chemical strengthening process.

Figure 6:
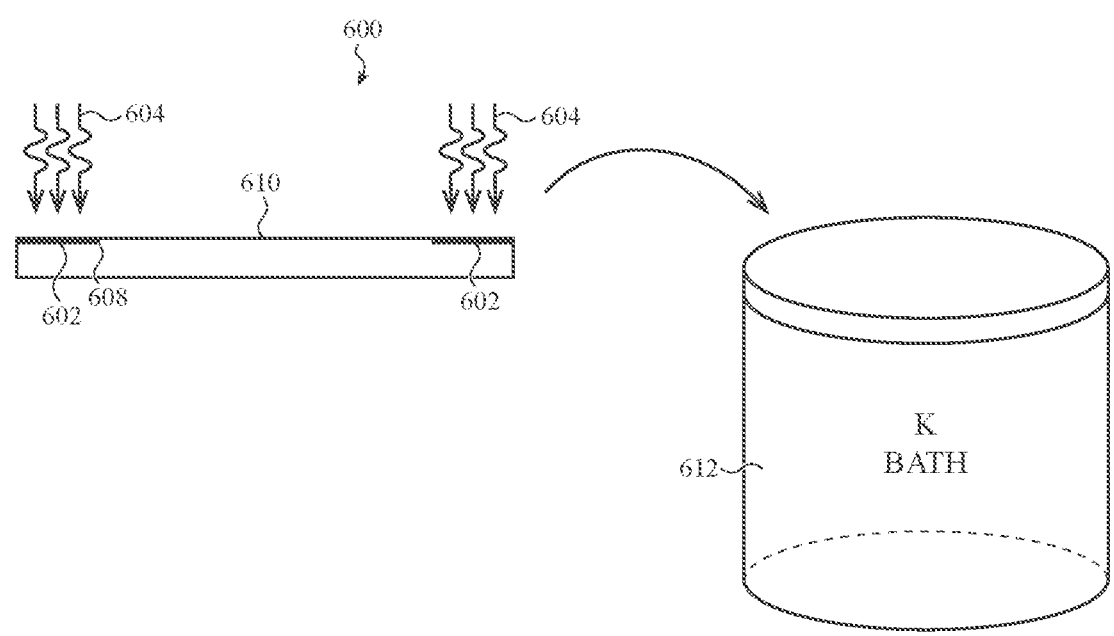
FIG. 6 is a diagram of a partial cross-sectional view of a glass cover, which shows two zones of densified glass.

As shown in FIG. 6, the pre-heating of the glass article 600 can be localized (and not across the entire surface(s) of the glass article), such that target or predetermined zones 602 of the glass article are densified. In this embodiment, localized heating (shown as arrows 604) is performed prior to chemical strengthening and to a point between the glass's strain point temperature and softening temperature. Laser or inductive coil heating can be used to pre-heat the location and thereby provide a glass article that includes both densified 608 and non-densified glass surfaces 610. FIG. 6 shows a simple cross section of a glass cover 600 where the sides have been locally pre-heated to form densified glass 608, while the center of the glass article exhibits non-densified glass 610.

Embodiments herein include glass articles pre-treated by heating techniques to form densified glass over an entire surface, or in predetermined zones or locales, leaving zones of different glass density. When a glass article so treated is chemically strengthened 612, the article will be asymmetrically strengthened and have an asymmetric stress pattern, where densified glass exhibits a higher surface compression stress, but to a shallower depth, than corresponding non-densified glass. It is envisioned that the timing and placement of the pre-heating can be used to optimize a glass surface compressive stress and the depth of the compressive stress.

Although not explicitly noted in all embodiments herein, all glass article embodiments herein may include the use of glass articles that have been pre-heated to densify the glass prior to chemical strengthening.

Chemical Strengthening of Preferred Edge Geometries

Certain glass article edge geometries can also be used to strengthen a glass article for a particular utility in combination with chemical strengthening. For example, embodiments herein provide predetermined geometries useful in the strengthening of glass covers. Edge manipulation can be accomplished, for example, by machining, grinding, cutting, etching, molding or polishing.

Illustrative rounded edge geometries for a glass cover useful in an electronic device include manipulation of an edge to an edge radius of 10% of the thickness of the cover glass, e.g., 0.1 mm edge radius for a 1.0 mm thick glass cover. In other embodiments, the manipulation to the edge can include an edge radius of 20%-50% of the thickness of the cover glass, for example, 0.2 mm edge radius for a 1.0 mm thick glass cover, 0.3 mm edge radius for a 1.0 mm edge radius, etc.

In general, some embodiments herein show that rounding of the edges of a glass cover increases the strength of the glass cover. For example, rounding an otherwise sharp edge on a glass cover improves the strength of the edges, which thereby strengthens the glass cover itself. In general, the larger the edge radius, the more uniform the strengthening can be over the surface of the glass cover.

As such, in some embodiments herein, useful edge geometry can be combined with chemical strengthening to produce a more reliable and durable glass cover. For example, chemically strengthening to increase the compressive stress layer depth along the perimeter of a glass cover, combined with the four edges of the glass cover having an edge radius of 30%.

Although not explicitly noted in all embodiments herein, all chemically strengthened glass article embodiments herein may include 1, 2, 3 or 4 of its edges machined to a useful geometry. For cover glass designs the rounding may be from 10-50% of the thickness of the cover glass.

Stress Profiles

Chemically treating a glass article in accordance with embodiments herein effectively strengthens the exposed or treated surfaces of the glass. Through such strengthening, glass articles can be made stronger and tougher so that thinner glass can be used in portable electronic devices.

Figure 7A:
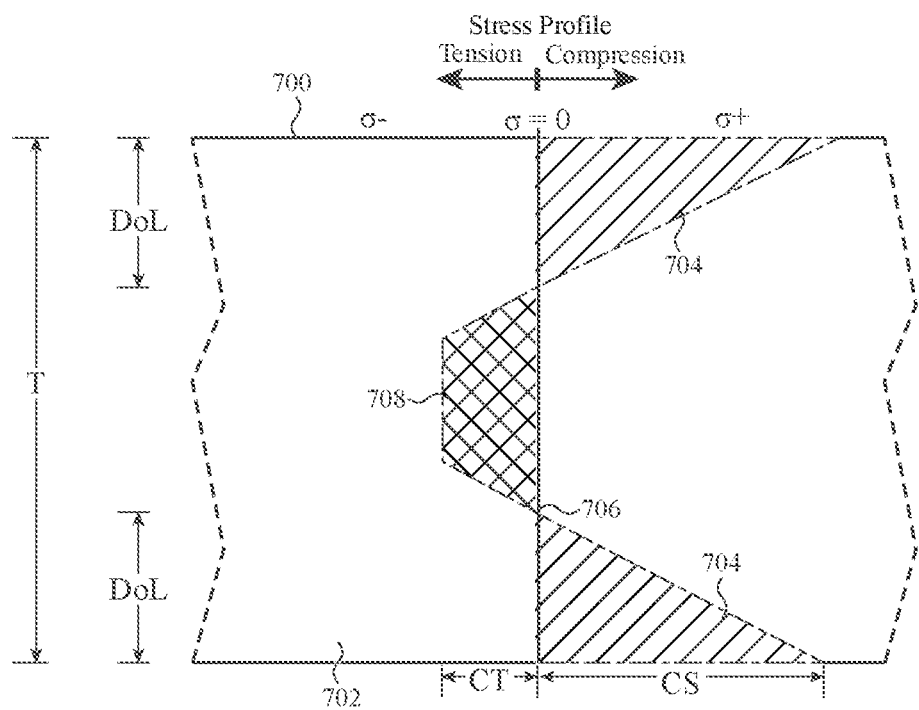
FIG. 7A is a diagram of a partial cross-sectional view of a glass cover, which shows a tension/compression stress profile in accordance with embodiments herein.

FIG. 7A is a diagram of a partial cross-sectional view of a glass article, for example a glass cover. The diagram shows an initial tension/compression stress profile according to one embodiment. The initial tension/compression stress profile may result from an initial exchange process to symmetrically strengthen the surface region of the glass. A minus sigma legend indicates a profile region of tension, while a plus sigma legend indicates a profile region of compression. The vertical line (sigma is zero) designates crossover between compression and tension.

In FIG. 7A, thickness (T) of the glass cover is shown. The compressive surface stress (CS) (i.e., surface compressive stress) of the initial tension/compression stress profile is shown at the surface of the cover glass. The compressive stress for the cover glass has a compressive stress layer depth (DoL) that extends from surfaces of the glass cover towards a central region. Initial central tension (CT) of the initial tension/compression stress profile is at the central region of the glass cover.

As shown in FIG. 7A, the initial compressive stress has a profile with peaks at the surfaces 700 of the glass cover 702. That is, the initial compressive stress 704 is at its peak at the surface of the glass cover. The initial compressive stress profile shows decreasing compressive stress as the compression stress layer depth extends from surfaces of the glass cover towards the central region of the glass cover. The initial compressive stress continues to decrease going inwards until crossover 706 between compression and tension occurs. In FIG. 7A, regions of the decreasing profile of the initial compressive stress are highlighted using right-to-left diagonal hatching.

The peaks at the surface of the glass cover provides an indication of the bending stress a glass article can absorb prior to failure, while the depth of the compressive layer provides protection against impact.

After crossover between compression and tension, a profile of the initial central tension 708 extends into the central region shown in the cross-sectional view of the glass cover. In the diagram, FIG. 7A, regions of the decreasing profile of the initial central tension (CT) extending into the central region is highlighted using hatching.

Typically the combination of stresses on a glass article are budgeted to avoid failure and maintain safety, i.e., if you put too much stress into a glass article, the energy will eventually cause the article to break or fracture. Therefore, each glass article has a stress budget, an amount of compressive versus tensile strength that provides a safe and reliable glass article.

Figure 7B:
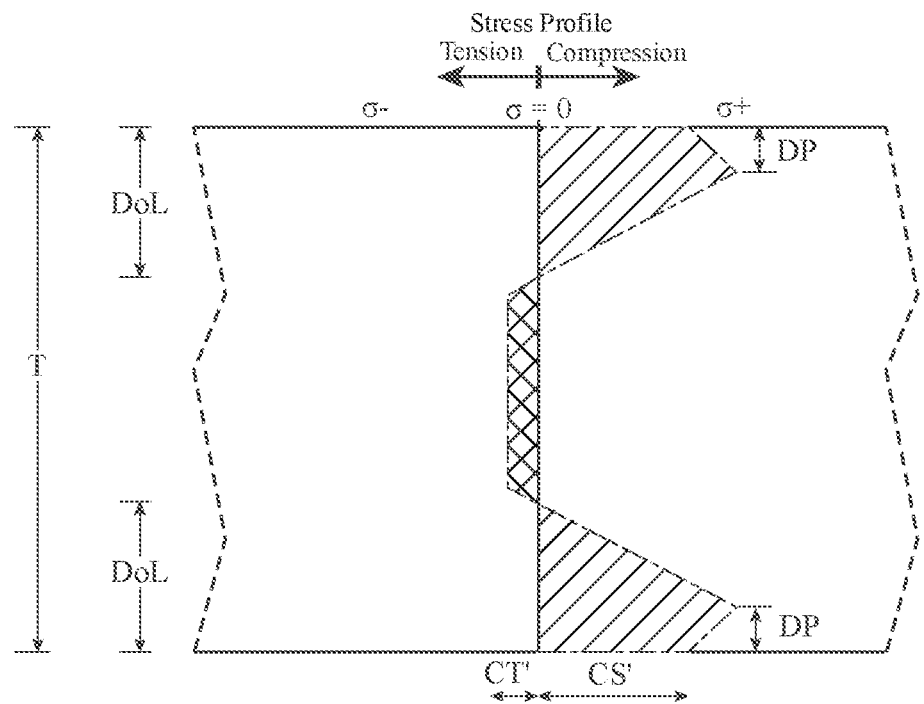
FIG. 7B is a diagram of a partial cross-sectional view of a glass cover, which shows a reduced tension/compression stress profile in accordance with embodiments herein.

FIG. 7B is a diagram of a partial cross-sectional view of a glass cover, which shows a reduced tension/compression stress profile according to one embodiment. The reduced tension/compression stress profile may result from a double exchange process. Reduced compressive surface stress (CS') of the reduced tension/compression stress profile is shown in FIG. 7B. The compressive stress layer depth (D) now corresponds to the reduced compressive stress. In addition, reduced central tension (CS') is shown in the central region.

In light of FIG. 7B, it should be understood that the reduced compressive surface stress (CS') shows increasing profiles as the compressive surface layer depth extends from surfaces of the glass cover and towards the submerged profile peaks. Such increasing profiles of compressive stress may be advantageous in arresting cracks. Within a depth (DoL) of the submerged peaks, as a crack attempts to propagate from the surface, deeper into the cover glass, it is met with increasing compressive stress (up to DP), which may provide crack arresting action. Additionally, extending from the submerged profile peaks further inward toward the central region, the reduced compressive stress turns to provide a decreasing profile until crossover between compression and tension occurs.

FIGS. 7A and 7B show a symmetric stress profile, where both sides of the cover glass have equal compressive stress, compressive stress layer depth, and central tension.

Figure 7C:
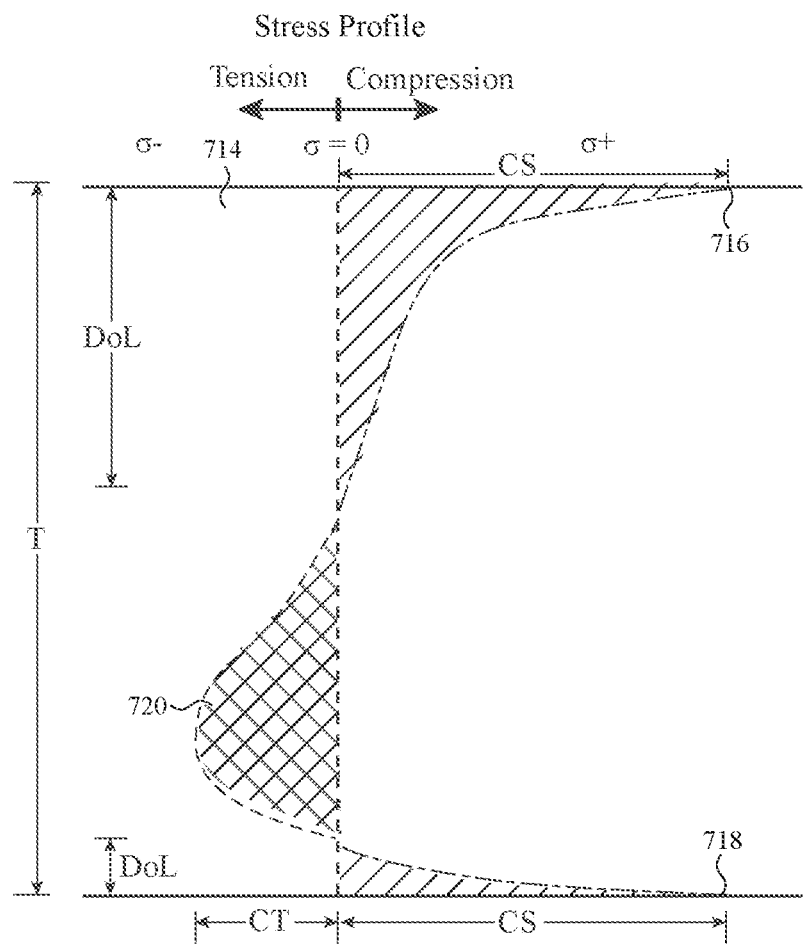
FIG. 7C is a diagram of a partial cross-sectional view of a glass cover, which shows an asymmetric tension/compression stress profile in accordance with embodiments herein.

FIG. 7C shows an asymmetric stress profile for a glass article 714 where the top surface 716 shows a more significant compressive stress CS and compressive stress layer depth (DoL) than the bottom surface 718. Note that the top surface 716 would, in this case, be more durable and impact resistant than the bottom surface. Also note that there is a stress budget, the inclusion of additional compressive stress on the surface may be compensated for by a much shallower depth of compression on the bottom surface. In the absence of the compensation, the tensile force 720 would be extended to the left and ultimately result in a highly unsafe glass cover (tensile strength would overcome compressive strength).

As will be discussed in greater detail below, design and production of glass cover articles having modified stress profiles like FIG. 7C for calibrated utility, are accomplished by using the asymmetric chemical strengthening processes described herein. By asymmetrically strengthening a glass article, calibrated and highly useful glass articles may be produced. In such instances, the stress budget for any piece of glass may be used to provide a stress profile, and therefore glass article, having an optimized surface for its utility.

Asymmetric Chemical Strengthening

Embodiments herein result in the production of asymmetrically strengthened glass articles. Asymmetrically strengthened glass articles, for example cover glass, can be designed to be more reliable, damage resistant, and safer than corresponding symmetrically strengthened glass articles.

Figure 8:
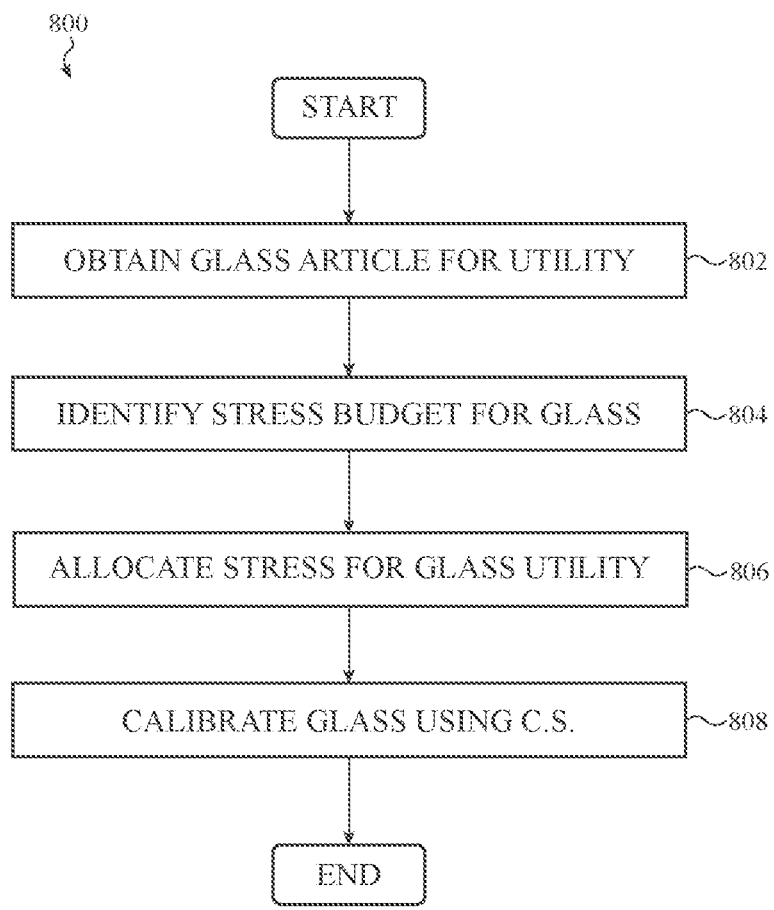
FIG. 8 is a flow diagram of asymmetric glass strengthening in accordance with embodiments herein.

FIG. 8 shows an illustrative flow diagram for asymmetrically strengthening a glass article 800. A glass article is identified for a desired utility based on its dimensions, its thickness, and its inherent composition 802. A budget for how much stress the identified glass can withstand is determined based on the glass's utility 804, and a budget determined for optimal reliability and safety for the glass, i.e., the stress in the glass is balanced to provide both strength and safety 806. The glass article is then calibrated to exhibit a useful stress pattern so as to maximize the stress budget and utility through use of asymmetric chemical strengthening 808.

For example, a piece of thin cover glass used on a portable electronic device optimally requires different properties over its surface. Asymmetry of the chemical strengthening may be required on the front- versus the back-side of a glass article, on the perimeter versus the center of a glass article, around features in a glass article, or in hard to polish areas in a glass article. However, as discussed above, each glass article has a stress pattern to avoid failure, where the compressive stress and tensile stress must be roughly balanced. As such, asymmetric chemical strengthening is used to optimize the properties of a particular glass article, within the glass article's stress budget, for a particular use.

In general, asymmetric chemical strengthening can be used to provide a higher (or lower) surface compression layer or a deeper (or shallower) stress layer, for a particular region, while maintaining the safety of the glass by not overstressing the tensile stress within the glass article. Where a surface of glass requires additional strength, the compression of the layer may be increased, where the glass requires protection from wear and tear, the depth of the compression layer may be modified, and the like. The ability to maximize the stress within a glass article for a zone or portion of a glass article, allows for the design of reliable and safe glass parts. In general, the relationship of the compressive stress (amount and depth) on the top and bottom surface of a glass article in relationship to the resultant tensile stress gives a stress pattern for the glass article. The stress pattern can be along the X, Y or Z axis of the glass article.

In embodiments herein, asymmetric chemical strengthening of a glass article is provided to: increase the reliability of a glass article for a particular use; to increase the safety of a glass article for a particular use; to facilitate target shapes or forms (flat or substantially flat) of a glass article for a particular use; to be used in combination with other techniques to facilitate a glass article's target shape or form; and other like utilities.

Figure 9:
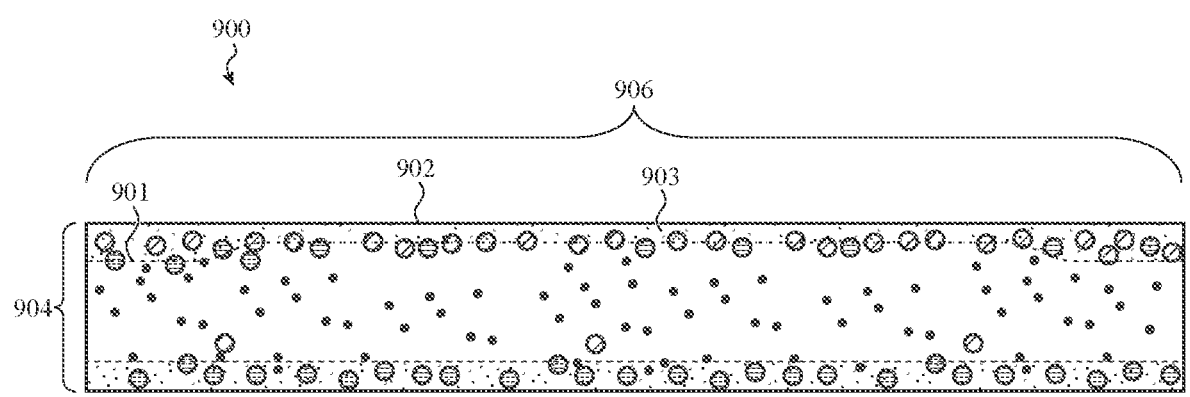
FIG. 9 is a cross-sectional diagram of a glass cover which has been asymmetrically chemically treated.

FIG. 9 shows that asymmetric chemical strengthening is dependent on differentially incorporating ions into a surface of a glass article. As noted above, a glass article 900, along any surface area 902, can exchange and incorporate ions to a particular depth and concentration based on the glass articles' density and overall ion saturation point, i.e., there is only so much volume in the glass that can be involved in exchange to larger sized ions, so to increase the articles compression (see 901 versus 903). The change in ion concentration along the surface, and to particular depths, modifies the glass internal stress relationship, this relationship extends across the thickness of the glass 904, as well as throughout the glasses interior portion (how the internal tension/compression stress changes across the middle of the glass article) 906. As such, and as discussed previously, a stress pattern can be across the thickness of a glass article (vertical—top to bottom surface) 904 as well as across or throughout the glass article (horizontal—side to side) 906.

Embodiments herein utilize these stress relationships to calibrated utilities to provide modified glass articles for use in portable electronic devices and small form factor devices.

Asymmetric Strengthening Via Masking or Coating

Embodiments herein include the application of masking or ion-diffusion barriers to portions of a glass article prior to immersion in the ion containing baths. For example, a portion of the glass surface can be physically masked from the ions in the chemical strengthening process via a diffusion impermeable material, such as a metal or ceramic, sealed over the region where diffusion is not wanted. This type of physical masking completely limits ion-diffusion into that surface and provides asymmetric strengthening, i.e., the masked surface will receive no ion exchange as compared to the other exposed surfaces of the glass article. Once chemically treated, the physical barrier would typically be removed from the glass article. Here you would have treated and untreated surfaces.

Figure 10:
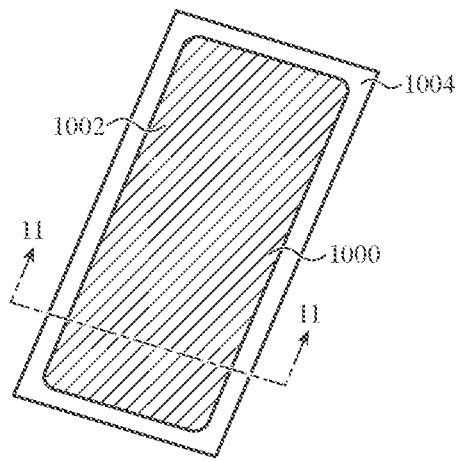
FIG. 10 is a cover glass having a silicon nitride coating applied to the center portion, while the edge and corner portions remain uncoated.

In another embodiment, as shown in FIG. 10, a coating or film composed of silicon nitrate (e.g., SiN, $Si_3N_4$), or other like material, is used instead of a physical mask. In FIG. 10, a coating 1000 is applied to the central portion of a glass cover 1002, while the edges and corners 1004 are left uncoated. Such a coating would limit or eliminate ion diffusion at the center zone or portion of the cover glass, while allowing chemical strengthening at the non-coated zones (edges and corners).

The coating is first applied to the glass article prior to the enhancement treatment to block substantially all ion diffusion through the coated portion of the glass article. Coatings can have a thickness of from about 5-500 nm, although other thicknesses may be used where appropriate. In this illustration, the coated surface of the glass article, upon completion of the chemical strengthening process, would not include a compression layer, whereas the remainder of the glass article would exhibit a compression layer. Upon completion of the chemical strengthening process, the coating could be removed via polishing from the glass article, providing a surface having asymmetric strengthening, or could be left on the surface of the glass, as part of the finished glass article. In this aspect, the coating would be tailored to an appropriate thickness and composition in order to remain part of the glass article.

In other embodiments, the silicon nitride coating can be oxidized after the chemical strengthening process is complete to provide a more ion-permeable barrier. The same glass article may now be re-immersed and processed through chemical strengthening, such that some ion diffusion occurs through the silicon dioxide barrier, and thereby some compression layer is formed at the locale (while the remainder of the glass article has been treated twice).

As just noted, a coating composed of alternative materials, silicon dioxide for example, can also be used to limit, rather than eliminate, ion diffusion to the surface of the glass article. For example, a coating composed of silicon dioxide would only limit ion diffusion to the glass article surface, allowing some level of compression layer formation in the coated region, but not the complete strengthening contemplated by the ion exchange baths. As above, the coating would be either removed upon completion of the chemical strengthening process, or left in place as part of the finalized article. In either case, the glass article would have a surface with asymmetric strengthening.

Figure 11A:
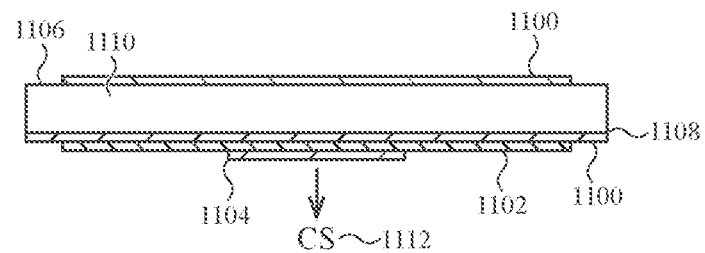
FIG. 11A is a cross-sectional diagram of a glass cover having a combination of coatings applied to the top and bottom surfaces.

FIG. 11 shows combinations of coating types (1100, 1102, 1104 . . . ) and thicknesses can be used in designing an asymmetrically strengthened glass surface. In FIG. 11A, a series of coatings (1100, 1102, 1104) are applied to both the top and bottom surface (1106 and 1108, respectively) of a glass cover 1110. Each combination of coating material is meant to control ion diffusion to the target glass surface, and thereby modify the chemical strengthening of that surface 1112.

Figure 11B:
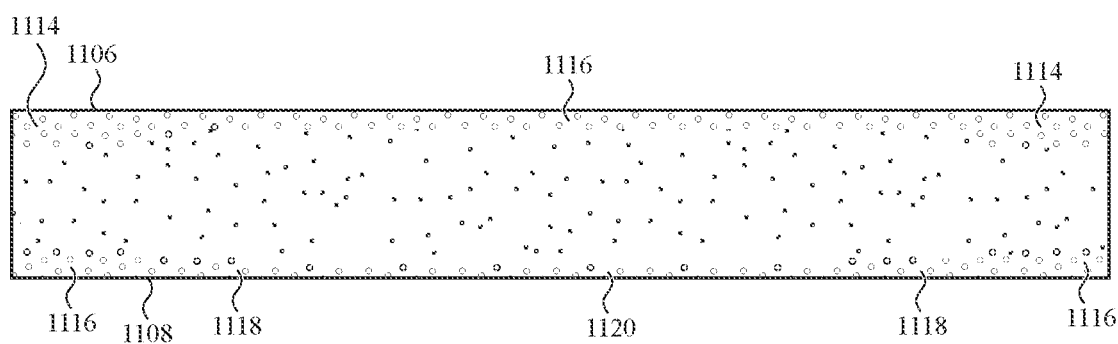
FIG. 11B is a cross-sectional diagram of a glass cover that illustrates the coating embodiments described in FIG. 11A.

The glass article can exchange and incorporate ions to a particular depth and concentration based on the ion diffusion through coatings 1100, 1102 and 1104. As described previously, the change in ion concentration along the surface, and to particular depths, modifies the glass internal stress relationship. The stress pattern shown in FIG. 11B illustrates that the edges 1114 of the top surface 1106, having no coating, receives the most robust ion concentration along the surface, and to the greatest depth. The remainder of the top surface 1106 shows some reduced ion incorporation, but to a lower extent than at the edges 1116. The bottom surface 1108, being internal, for example, has multiple zones defining three areas of ion incorporation 1116, 1118, 1120, based on the layered coatings. The center zone 1120 of the bottom surface has little or no ion incorporation due to coatings 1100, 1102, and 1104. The combined coatings eliminate almost all ion diffusion into the center zone. The other zones show some ion diffusion that results from either the single coating or the combination coating. Thus, a stress relationship where multiple coatings (ion barriers) have been applied to prepare an asymmetrically strengthened glass article is achieved.

It is further envisioned that multiple layers of coating can also be used to control the ion diffusion process into the target glass surface. For example, a thin coating that limits sodium and potassium ion diffusion from a chemical strengthening process by 25%, could be layered across a first thicker coating that limits sodium and potassium ion diffusion by 50%. The glass surface region would potentially have a region limited of ion diffusion by 0% (uncoated), 25% (first coat), 50% (second coat), and 75% (layered coat); other embodiments may have different percentages for each coat. As above, the finished glass article surface could include each of the coating layers, or could be treated to remove the coatings, leaving only the underlying asymmetrically strengthening surfaces. It is also envisioned that the ion-diffusion barrier coatings can be combined with the ion-barrier masks to further allow for calibrated glass article surface strengths—for example, physically mask a bottom surface of the glass cover and coat patterns or locales with a 25% ion diffusion barrier on the top surface of the cover.

Thermal Assisted Asymmetric Chemical Strengthening

Embodiments herein include asymmetric glass strengthening during the chemical strengthening process through the targeted application of heat. Preferential heating of a glass surface locale can be used to facilitate stress relaxation in that locate, and thereby allow for an increase in ion diffusion at that locale during the chemical strengthening process. Note that the heat is below the amount required to densify the glass as discussed above. An increase in ion diffusion allows for the exchange of additional ions into the glass, thereby changing the stress profile for the heated surface compared to the non-heated surface. For example, a localized region of a glass article can be heated through the use of heating coils, laser, microwave radiation, and the like, while the glass article is immersed in a chemical strengthening ion bath.

As noted above, the increase in heat at the target locale allows for an increase in ion diffusion in the glass surface at the heated locale. Enhanced heating of target locales on the glass surface provides asymmetric chemical strengthening at the heated locales as compared to non-heated surfaces. Asymmetric chemical strengthening using modified thermal profiles is of particular value where a laser or microwave beam can be directed to modify the chemical strengthening for parts having known failure spots. For example, cover glass that requires additional chemical strengthening at the corners to limit breakage as a result of impact.

Heating temperatures are appropriate where the heat is sufficient to relax the glass lattice, but not cause densification of the glass, or to cause boiling of the ions in the ion bath.

In one embodiment, a glass article is chemically enhanced by immersion in a first and second ion bath. While immersed in the first and/or second ion baths the thermal profile of some predetermined portion of the glass article is increased through use of directed heating (coils, laser, microwave, etc.). The targeted locale on the glass article undergoes additional ion exchange given the relaxed and expanded lattice of the glass. Once the thermal input is deemed sufficient, the asymmetrically strengthened locale, now having additional ions packed into the surface, can be quenched to inhibit exchange of the ions back out of the locale. Increasing the thermal profile during chemical strengthening can be used to both increase the compressive stress of the glass surface and compressive stress layer depth of the glass surface.

Local Asymmetric Strengthening Via Paste and Heat

As discussed in more detail below, it is often important to form a glass article where the stress in the glass article is matched to provide a particular shape, for example, provide a flat surface.

In one embodiment, localized chemical strengthening techniques can be used to promote ion diffusion into specific regions or zones of the glass article. These high concentration chemical strengthening zones can be used to instill higher surface ion concentration and/or deeper compression layers with target patterns or spots on the glass article. The inclusion of the enhanced chemical strengthening can be used to provide slight curvatures to the glass surface where required, or can be used to counteract each other on opposite sides of the glass surface (front and back surface, for example).

Pastes that include high concentrations of potassium, for example, can be used in combination with heat to enhance or promote ion diffusion directly from the paste into the localized surface of the glass article. This high concentration and direct ion diffusion is superior to the ion diffusion accomplished by immersion in ion baths. In one embodiment, a glass article, requiring an increased amount of ion diffusion in a predetermined pattern, is coated with a high ion concentration paste in the predetermined pattern. The paste can be 30-100% molar sodium or potassium nitrate for example, and more typically 75-100% molar. The paste layer thickness is determined by how much ion is required for diffusion into the glass article surface. The coated glass article is then placed in an oven and heated, for a predetermined amount of time, to increase the diffusion of the ion into the glass surface in the predetermined pattern. Ovens can be electric or gas (or other like) and reach temperatures from about 250-500° C. In some embodiments, the oven can be under pressure, allowing for use of higher temperatures during the heating step (and thereby avoiding evaporated or boiled paste).

Figure 12A:
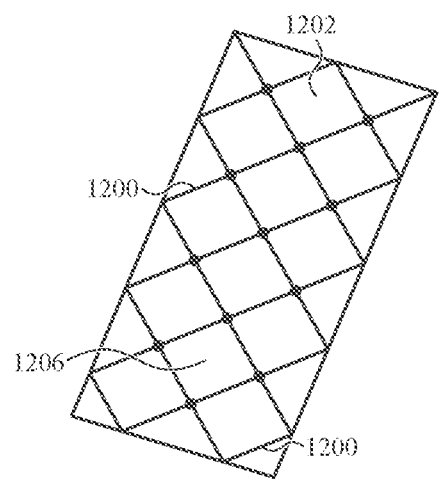
FIGS. 12A and 12B illustrate the use of high ion concentration pastes on the front and back surfaces of a cover glass.
Figure 12B:
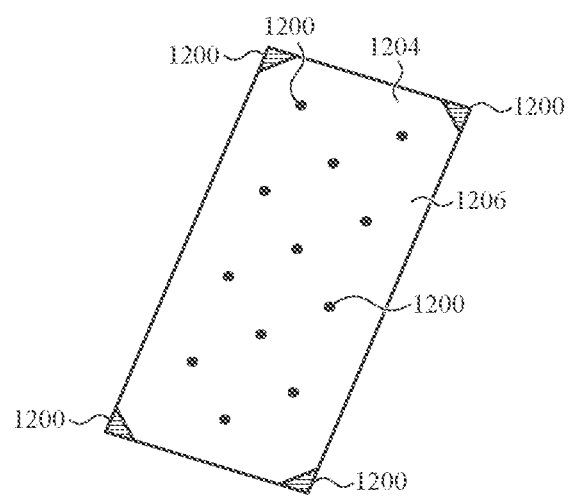

FIG. 12A and FIG. 12B illustrate the use of high concentration ion pastes 1200 on the front (12A) and back (12B) surface (1202 and 1204, respectively) of a cover glass 1206. Paste application patterns can be used to facilitate allocation of asymmetric strengthening, and counterbalance stress added on the front cover with stress added to the back cover. In FIGS. 12A and 12B, illustrative front and back surface patterns are presented.

In other embodiments, the already enhanced coated glass article is coated with the high ion concentration paste, potassium for example, and then placed into the potassium ion bath. The coated glass article and ion bath are then placed in the oven for heating, such that the paste directly deposits potassium to the glass surface, while the potassium ion bath allows for ionic diffusion to the non-coated or exposed surfaces of the glass article.

Altering the ion concentration in the paste, the pattern of paste application on the glass surface, the heating parameters of the paste, the coating thickness of the paste, provide various design options for creating an asymmetrically strengthened glass article.

As can be imagined, paste with high ion concentrations can also be combined with masking, ion-barrier coatings and glass density to further optimize the necessary chemical strengthening for a target glass article. Also, as can be imagined, paste with multiple ions can be used as well as coating a glass article surface with one or more, two or more, three or more, etc. different pastes, each having a different ion or ions concentration.

Electric Field Assisted Asymmetric Chemical Strengthening

As shown above, embodiments herein include asymmetric glass strengthening during the chemical strengthening process. In this embodiment, ion transport in the ion bath is preferentially increased toward a target surface of the glass article, thereby increasing the diffusion of the ions at the target surface. Increased concentration of the ion at a surface allows for an increase in the amount of ion incorporated into the glass surface, up to the glass article's ion saturation point, as compared to the remainder of the article's surface not in-line with increased ion concentration.

Aspects of this embodiment are maximized by utilizing an ion concentration, in the ion bath, that provides for chemical strengthening, but below the glass articles' ion saturation point. In this aspect, the electric field would significantly increase the ion concentration at surfaces in-line with the preferential transport of ions across the electric field.

Figure 13:
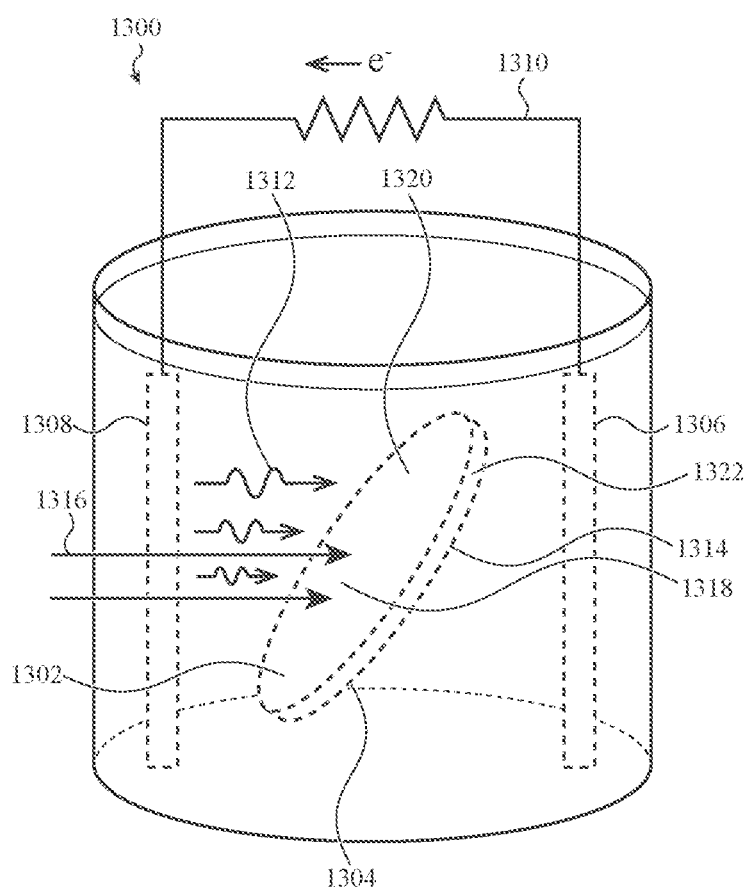
FIG. 13 shows an alternative glass strengthening system in accordance with embodiments herein.

In an illustrative embodiment, an electric field is established in an appropriate ion bath to preferentially diffuse the ion across the target surface of the immersed glass article. As shown in FIG. 13, a glass article 1304 in need of asymmetric chemical strengthening is positioned in the ion bath 1300 between a positive 1306 and negative electrode 1308. Electron flow through the external circuit 1310 allows the bath ions, potassium for example, to flow toward the negative electrode and thereby into the front surface 1302 of the positioned glass article (shown as arrow 1312). The increase in ion concentration at the front surface of the glass article provides for an asymmetric strengthening of the front surface, as the front surface 1302 will have an increase in ion diffusion, as compared to the back surface 1314 of the glass.

Alternative embodiments for the electric filed gradient include performing the preferential ion diffusion in combination with coil, laser, microwave or other thermal heating (shown as arrow 1316). In this embodiment, a glass article 1304 is exposed to localized microwave radiation 1316, for example, where increased chemical strengthening is required. The microwave radiation facilitates stress relaxation at the target surface 1302. A glass article surface receiving preferential ion diffusion in the ion bath due to the established electric field, may have additional ion diffusion into the surface where the microwave radiation facilitates stress relation (provides more space for ions to enter the glass surface). As can be imagined, a glass article 1304 so treated could have several different asymmetrically strengthened zones, the zone that was heated 1318 and in-line with the ions in the electric field, zones not heated but in-line with the ions in the electric field 1320, zones heated but not in-line with the ions in the electric field (not shown), and zones that are neither heated or in-line with ions in the electric field (1322).

Asymmetric Strengthening Via an Introduced Pre-Bend

Asymmetric strengthening can be introduced into the surface of a glass article by pre-stressing the glass prior to, and during, the enhancing and strengthening process. In one embodiment, the glass article is formed (molded, drawn, etc.) to have a pre-desired curvature. The formed glass article is placed under the correct force to maintain the form and then chemically strengthened using the embodiments as described above. For example, the formed glass article is placed in the ion exchange baths in the pre-stressed or formed shape. Since the glass is bent while the glass is being chemically strengthened, it is strengthened in an enhanced manner. So, for a curved or bent glass article, the chemical strengthening is primarily going to the outer, curved, surface (ions more easily diffuse into the stretched glass lattice), while the compressed inner surface undergoes limited chemical strengthening. Different portions of the outer surface of the glass article may be selectively chemically strengthened, or chemically strengthened differently, and/or the glass article can be bent selectively or differently to offset the asymmetric chemical strengthening of the different portions. After the pre-stressed glass article is released from its pre-bend, the outer surface will have a greater amount of strengthening as compared to the inner, thereby showing an asymmetric strengthening profile.

Figure 14A:
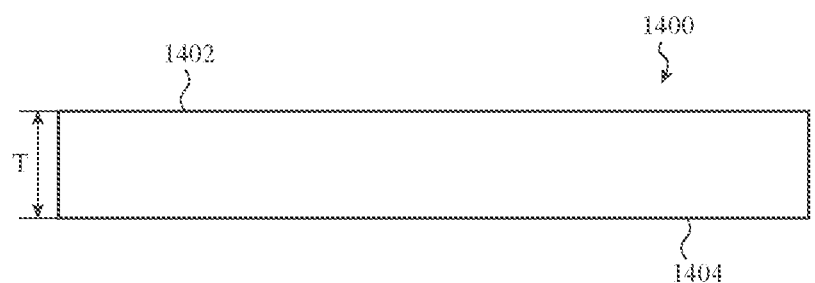
FIGS. 14A-14E illustrates processing to chemically strengthen a pre-bent glass in accordance with embodiments herein.

FIG. 14A-14E illustrate chemically strengthening a glass article according to one embodiment. In FIG. 14A, the glass article 1400 is shown having a thickness T. The thickness T can be generally as described throughout this disclosure (0.3-5 mm). The glass article 1400 has an outer surface 1402 and an inner surface 1404.

Figure 14B:
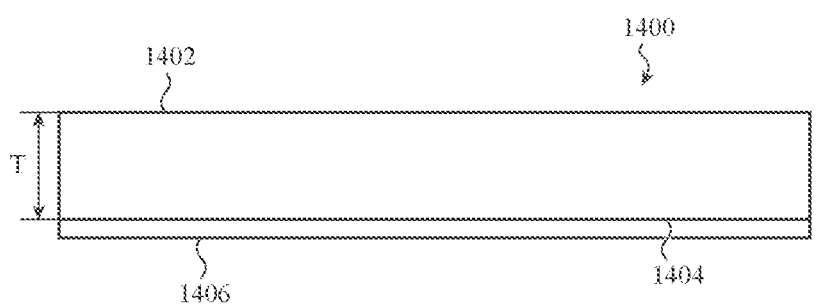

In FIG. 14B, an ion-exchange coating (as discussed above) 1406 is coated onto the inner surface 1404 of the glass article 1400. In this way, the ion-barrier limits ion diffusion into the inner surface of the glass article.

Figure 14C:
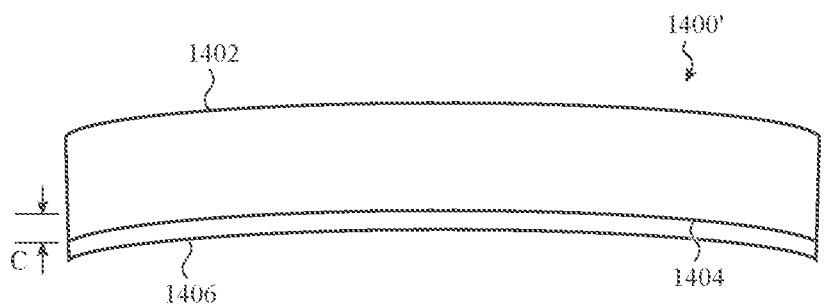

In FIG. 14C, the glass article has been bent such that the bent glass article 1400' is curved inward towards the inner surface 1404. The bending of the glass article yields the glass article with curvature C. The curvature in the glass article 1400' can be of varying degrees, and can be imposed by force (a fixture) or by including a heated environment (slumped over).

Figure 14D:
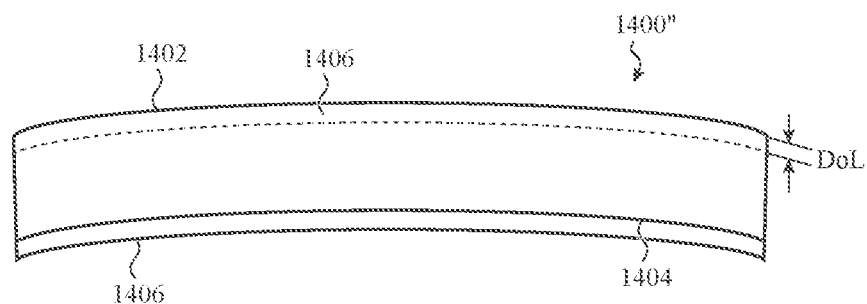

In FIG. 14D, the bent glass article from FIG. 14C undergoes chemical strengthening to yield a glass article 1400" having a strengthened region 1406. The chemically strengthened region 1406 is provided adjacent the outer surface 1402 and not adjacent the inner surface 1404. The chemically strengthened region extends inward from the outer surface to a depth of layer (DoL), which is deeper into the glass than the DoL at the inner surface (which is minimal or non-existent). Since the outer surface is chemically strengthened substantially more than the inner surface, the chemically strengthened glass article 1400" can be referred to as being asymmetrically chemically strengthened.

Figure 14E:
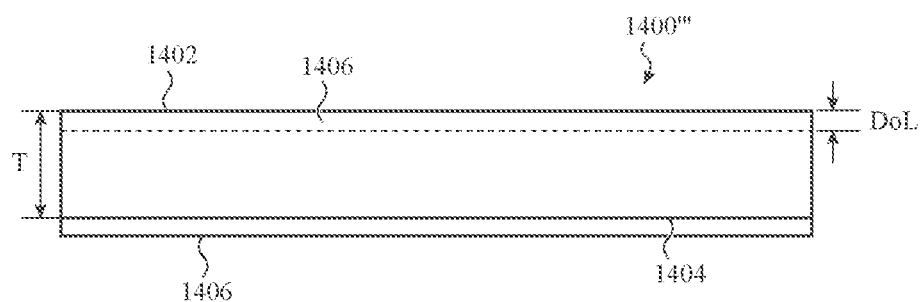

FIG. 14E illustrates the chemically strengthened glass article 1400''' after completion of the chemical strengthening process. The glass article 1400''' is depicted as planar, or at least substantially planar, following completion of the process. The completed glass article 1400''' has an outer surface 1402 with increased compression and an inner surface 1404 that was both bent inward and coated by an ion-exchange coating to limit or eliminate chemical strengthening. In this profile design, the chemically strengthened glass article 1400''' tends to wrap inward from the outer surface—meaning the outer surface compresses and expands. In such case, the warpage due to the chemical strengthening of the outer surface but not the inner surface causes the curvature C to be countered. Consequently, the chemically strengthened glass article 1400''' no longer has a curvature as it had prior to the beginning of the chemical strengthening.

Asymmetric Strengthening Different Clad Layers

Figure 15:
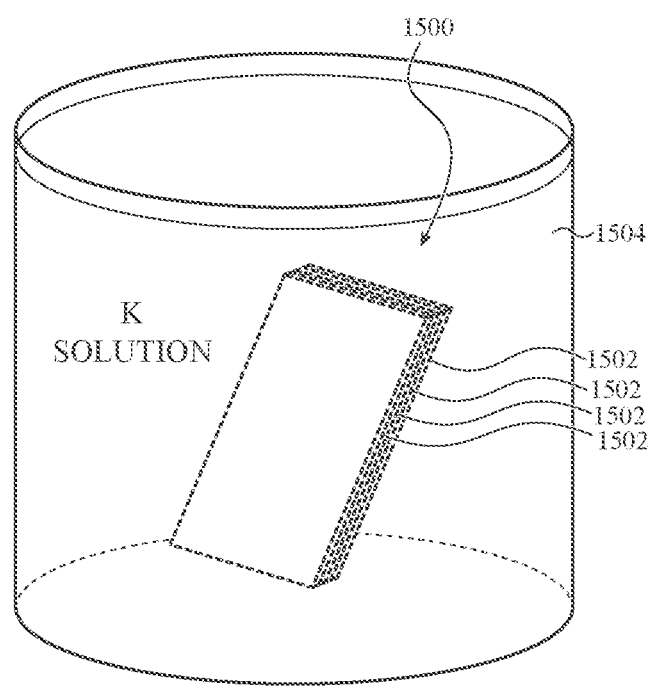
FIG. 15 shows a glass strengthening system for clad layered glass articles in accordance with embodiments herein.

FIG. 15 illustrates another Embodiment herein which includes forming asymmetrically strengthened glass articles 1500 through immersion of glass article clad layers 1502 in the chemical strengthening bath 1504, where each glass article in the clad layer has a different starting ion concentration and composition. A clad layer having a first and second glass article is then strengthened using the chemical strengthening processes described herein to provide two glass articles with asymmetric strengthening.

In one aspect, since the starting compositions of the two glass articles are different, the exposed surface and edges of each glass article will incorporate available ions differently. The end result of the chemical processing step will be two glass articles with a protected surface (internal to the clad layering) and a chemically modified exposed surface and edges. Modification of the exposed surfaces can be made by masking or coating, or other embodiments herein, as described previously. Any number of articles can be strengthened in this way, for example, in FIG. 15, three glass articles are being strengthened at the same time.

Chemical Strengthened Glass Article Bundles

In other aspects, asymmetrically strengthened glass articles having substantially the same stress profiles can be bundled together for common treatment to alleviate or modify the stress in the bundled glass. Here, the glass articles can be bundled as multiple plates to one another and treated together to maximize efficiency. Glass articles can be bundled as non-planar parts, treated, and then bonded to display a bonding stress or could be pre-bent and then bonded to display the bonding stress.

Asymmetric Strengthening Glass Articles Having a Concentration Gradient

In another embodiment, two glass articles of differing composition can be fused together prior to the chemical strengthening process. Here, the fused glass article will have a top surface chemically strengthened based on its starting glass ion concentration and composition (top glass), and a bottom surface chemically strengthened based on its starting glass ion concentration and composition (bottom glass).

In addition, using the same premise, one glass piece having a concentration gradient (composition or ion) can also be chemically strengthened to provide asymmetrically strengthened glass. As above, the glass article has differing ions, at differing locations of the glass article, to be exchanged in the ion baths, such that the resultant surface will be asymmetrically strengthened.

Design of the starting glass, including its starting ion concentrations and locations, can therefore by used to calibrate the ion-diffused and asymmetrically strengthened glass.

Mechanical and/or Chemical Modifications to Tune a Stress Profile

Embodiments herein include the use of post-chemical strengthening, mechanical and/or chemical processes, to fine tune a glass article's stress. Where a glass article has been prepared according to any of the embodiments described herein, fine tuning of the compressive stress layer, for example, or tuning of the relationship between the tensile and compressive forces, in the glass may be required. Removal of material, either mechanically (grinding, polishing, cutting, etc.) or chemically (application of HF or other like acid), can be used to locally modify the stress profile for the glass article.

For example, where it is determined that the extent of the compressive surface stress layer is too large, or deep, removal of some amount of the layer will relieve stress and re-calibrate the stress profile for the glass article. These post-chemical strengthening embodiments are particularly useful where the stress modification need only be minor, for example removal of 10 µm from a limited region of the cover glass.

Asymmetric Chemical Strengthening During Glass Article Production

Embodiments herein include the stepwise modification of a glass articles stress profile based on the use of one or more of the chemical strengthening embodiments described herein. For example, where production of a glass article results in a non-conforming or unsatisfactory result, the asymmetric chemical strengthening embodiments described herein can be used to reform the stress so as to bring the glass article into compliance. This may entail localized asymmetric chemical strengthening, or conversely, removal of material, with the object of adding or removing stress where necessary to correct any defects in the glass article.

Figure 16:
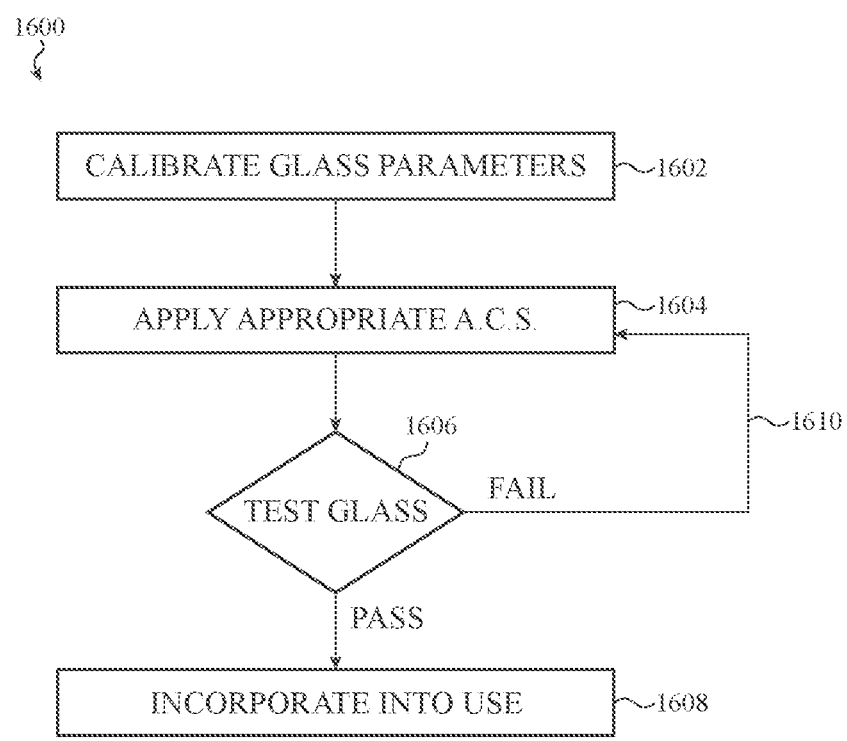
FIG. 16 is a flow diagram of glass article production using asymmetric glass treatment.

FIG. 16 illustrates one flow diagram including the process for asymmetrical chemical strengthening during glass article production 1600. A glass article having already been assigned a particular calibrated stress pattern 1602 is appropriately treated using any of the embodiments herein described 1604. The reliability and safety of the glass is tested by determining whether the glass cover exhibits the correct strengthening parameters 1606. Where the glass article conforms to the asymmetric chemical strengthening, the glass article is submitted for its use 1608. Where a glass article fails to exhibit its appropriate chemical strengthening, it is passed through the processes and embodiments described herein to reapply the appropriate chemical strengthening and tested 1610. This process can be repeated as many times as necessary to obtain a glass article that conforms to the standards of its use.

As such, embodiments herein include monitoring and correction of a glass articles predetermined stress profile. Correction can include a number of stress modifying iterations until the desired glass article stress profile is obtained.

Asymmetric Chemical Strengthening to Manage a Fracture Pattern

Figure 17A:
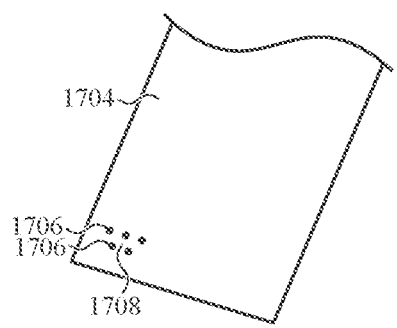
FIGS. 17A and 17B illustrate chemically strengthening at potential fracture spots to minimize fracture propagation.
Figure 17B:
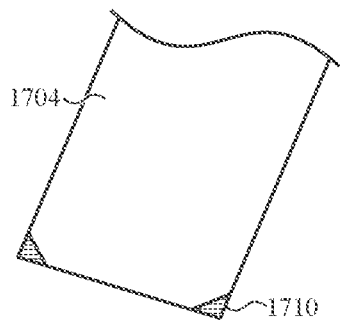

Embodiments herein include asymmetrically strengthening a glass article to exhibit or manage a predetermined fracture pattern. FIGS. 17A and 17B show illustrative chemical strengthening 1706/1708 applied to a cover sheet 1704 to minimize fracture propagation (17A) or minimize corner damage 1710 (17B).

Figure 18:
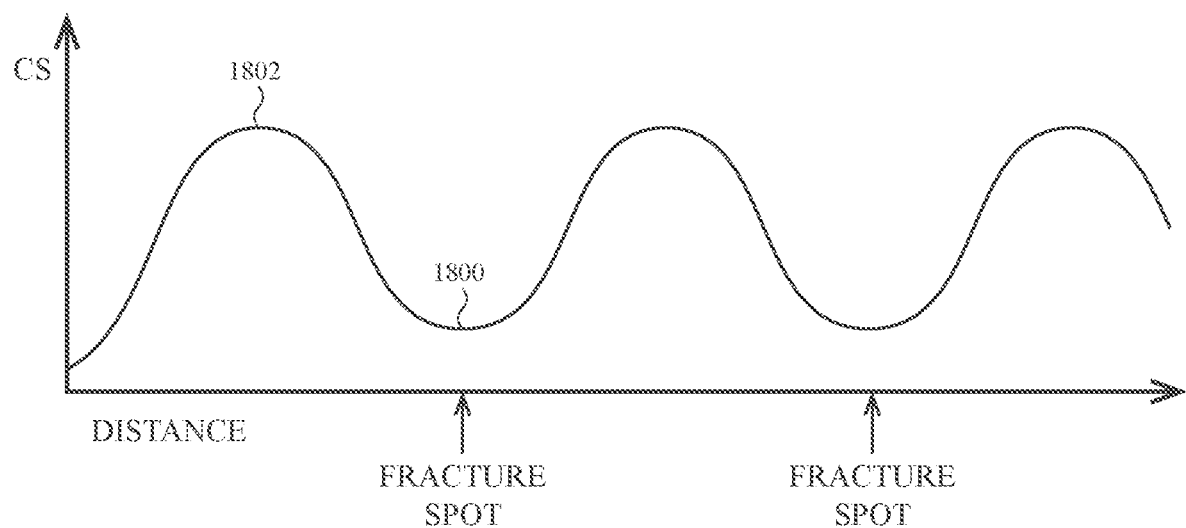
FIG. 18 is a fracture pattern stress plot in accordance with embodiments herein.

FIG. 18 shows a surface stress (CS) to distance graph illustrating that points of tension 1800 can be developed along the surface of a glass article where a fracture would be more likely to occur than at points of high surface stress 1802.

Using any of the embodiments described herein, an optimal fracture pattern for the particular glass article use can be developed. Embodiments include positioning the amount of surface compression stress, the depth of compression stress, the top surface to bottom surface tensile to compressive stress, and the planar tensile to compressive stress, in an optimized pattern. A glass article can be calibrated to control the fracture pattern upon damage or excessive wear and tear by identifying and then incorporating the necessary compressive surface stress, depth of stress and tensile stress, so as to facilitate a fracture in some regions, should one occur, as compared to other regions. In this way, a crack could be encouraged along a perimeter as compared to the center of the cover glass, for example. In one example, more significant tensile stress is positioned in a desired fracture location 1706 or 1710 as compared to locations of less preference.

Crack development and propagation can be managed by the irregular use and positioning of stress 1706, for example.

Designing a Cover Glass to Reduce Damage, or the Propagation of Damage, Caused by an Impact Embodiments herein result in the production of asymmetrically strengthened cover glass for a portable electronic device. As previously disclosed, the combination of stresses on the cover glass are budgeted to avoid failure and maintain safety, i.e., with a limited volume of glass, only so much ionic material may be added to the volume before the glass will crack or fail, simply due to the tensile stress becoming overly voluminous and exerting sufficient pressure to crack the glass.

In embodiments herein, asymmetrically strengthened cover glass has a stress budget optimized to resist damage caused by impact from dropping, fumbling, hitting, and the like of the device, e.g., a mobile phone dropping from the users hand and falling to the floor. In this light, most portable devices, when impacted, tend to initially impact at a corner of the device, or to a lesser extent, impact at a perimeter straight edge of the device. The impact is therefore aligned with the corners of the cover glass and, to a lesser extent, the perimeter or edge of the cover glass. It is less likely, and more infrequent, that a dropped device will initially impact at the front side or back side of the device, i.e., land flat on its face or flat on its back. As such, embodiments herein are optimized to limit or reduce damage (or the propagation of damage) in a cover glass by designing the cover glass with the expectation that impact will result at a corner of the cover glass, or at the very least, a perimeter straight edge of the cover glass.

As discussed previously, asymmetric chemical strengthening can be used to provide modified surface compression within a cover glass. The asymmetric strengthening must conform to a stress budget for the particular parameters of the glass. Embodiments herein include cover glass designs where the stress budget is utilized to provide the most impact resistance at the cover glass corners, followed by impact resistance along the straight perimeter edges, and to a lesser extent the substantially flat front and back surfaces of the glass. The budgeted stress is therefore substantially utilized at the corners, and to some extent, along the perimeter of the cover glass. Little or no stress budget is allocated to the center or remainder zone of the cover glass. The imparted strengthening is adequate to enhance impact resistance from damage. In addition, since little of the stress budget is used in the center or remainder zone of the cover glass, that zone is under little to no imbalance and can remain substantially flat.

Figure 19:
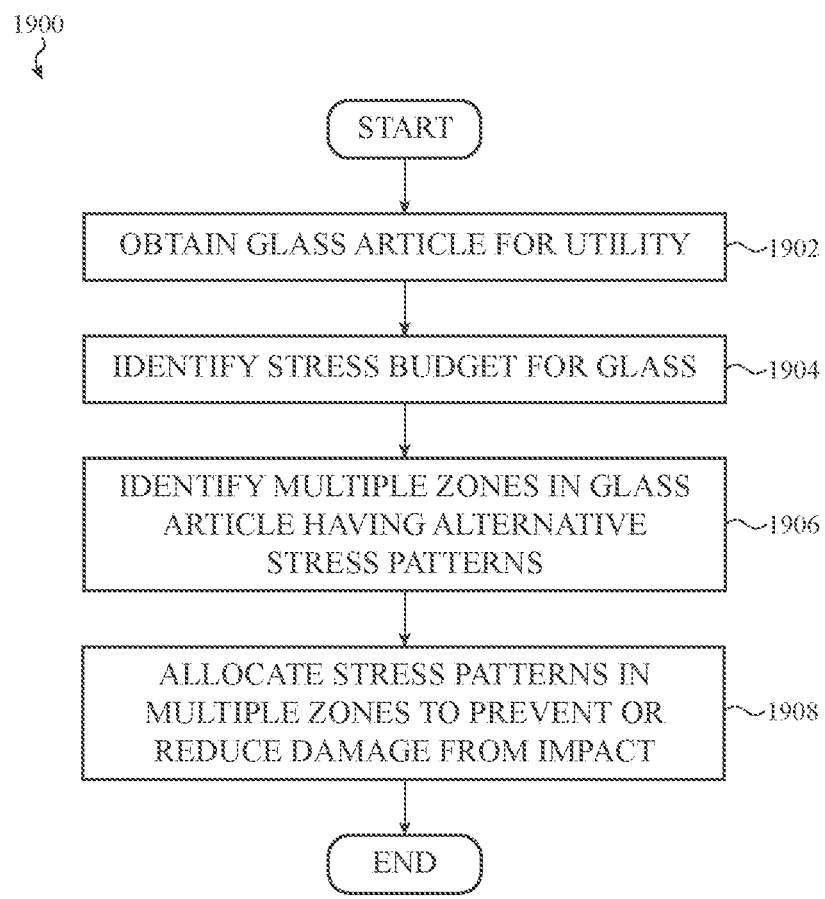
FIG. 19 is a flow diagram of glass article production where the glass article has at least three zones of different chemical strengthening.

FIG. 19 shows an illustrative flow diagram 1900 for asymmetrically strengthening a glass article having multiple zones, each zone having a different stress profile. In operation 1902, a glass article is obtained for a desired utility based on its dimensions, its thickness, and its inherent composition. In operation 1904, a budget for how much stress the identified glass can withstand is determined based on the glass's utility, and a budget determined for enhanced resistance to impact damage caused by a drop, for example. As described throughout, the budget must conform to the restricted volume of the glass, as inclusion of too much stress in the glass can cause the tensile stress to lead to cracks or damage under normal use constraints.

In operation 1906, the glass article is then divided into multiple zones. For example, a first zone in the glass may have the highest amount of chemical strengthening, followed by a second zone, followed by a third zone having the least amount of chemical strengthening. In operation 1908, the glass article has a stress pattern based on the three different zones, for example, a first stress pattern having the greatest strength related to impact, a second stress pattern having a smaller amount of strength than the first zone, and a third stress pattern having the lowest level of strength. In some embodiments the third zone has little or no chemical strengthening.

Figure 20:
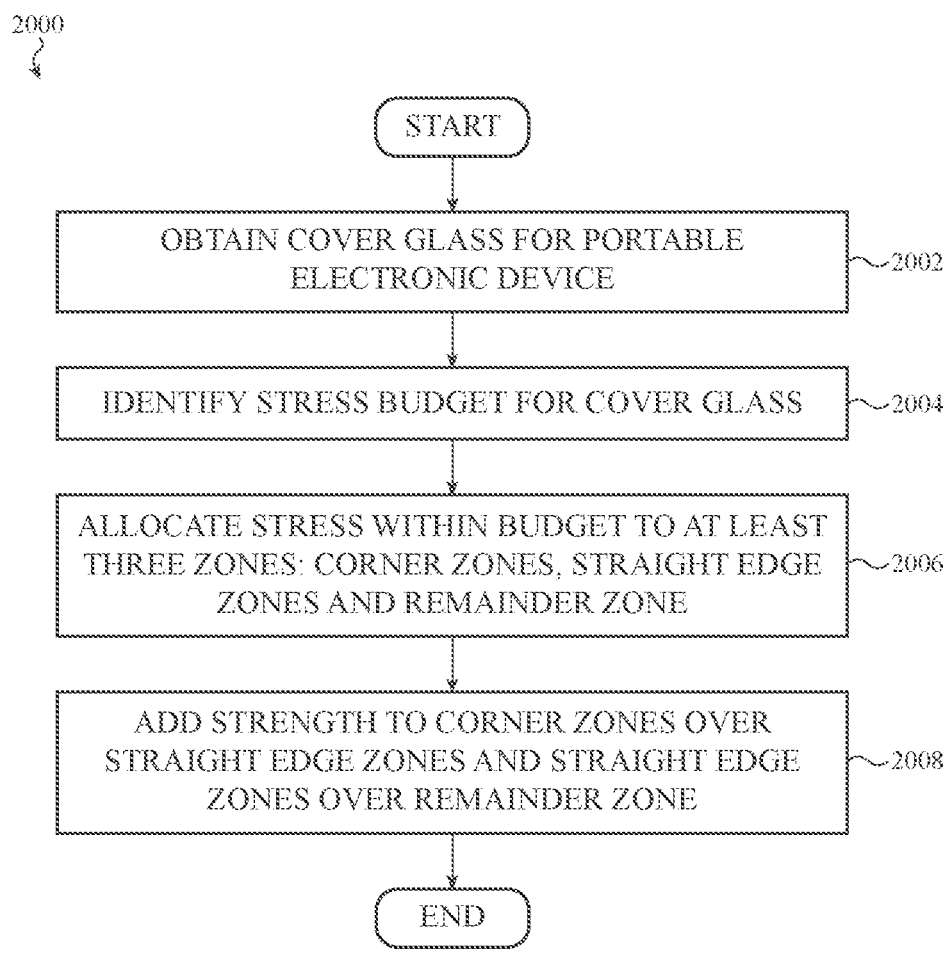
FIG. 20 is a flow diagram of cover glass production where the glass article has the greatest amount of chemical strengthening in its corners, a lesser amount of chemical strengthening along its perimeter side edges and the least amount in the remainder of the glass.

FIG. 20 shows an illustrative flow diagram 2000 for asymmetrically strengthening a cover glass for a portable electronic device having three or more zones, each zone having a different stress profile. In operation 2002, a cover glass is obtained having the dimensions, thickness and composition typically called for use in the portable electronic device of interest. In operation 2004, a budget for how much stress the cover glass can withstand is determined, where the budgeted stress maintains a substantially flat cover glass with enhanced damage resistance in the event of an impact, a drop for example. The cover glass can be divided into three zones, a first zone corresponding to the corner portions or areas of the cover glass, a second zone corresponding to the straight perimeter portions (also referred to as peripheral edge areas) of the cover glass, and a third zone corresponding to the remainder or center area of the cover glass. In some embodiments, the three zones refer to the top surface of the cover glass, or to a stress profile that extends from the top surface to the bottom surface. The first and second zones can include up to 50% of the cover glass area (leaving 50% of the cover glass area for the third zone), up to 40% of the cover glass area (leaving 60% of the cover glass area for the third zone), up to 30% of the cover glass area (leaving 70% of the cover glass area for the third zone), up to 20% of the cover glass area (leaving 80% of the cover glass area for the third zone), up to 15% of the cover glass area (leaving 85% of the cover glass area for the third zone), up to 10% of the cover glass area (leaving 90% of the cover glass area for the third zone), up to 5% of the cover glass area (leaving 95% of the cover glass area for the third zone), up to 2.5% of the cover glass area (leaving 97.5% of the cover glass area for the third zone), and up to 1% of the cover glass area (leaving 99% of the cover glass area for the third zone).

In typical embodiments herein, in operation 2006, the glass article can be divided into a first zone that includes a first stress pattern useful for the corner portions of the cover glass, a second zone that includes a second stress pattern useful for the straight perimeter portions or edge portions of the cover glass, and a third zone that has a stress pattern useful for the remainder of the cover glass. In operation 2008, the budgeted stress is allocated to the three zones where the first zone is strengthened more than the second zone, which is strengthened more than the third zone. In some embodiments the third zone undergoes little or no chemical strengthening, and the entirety of the stress budget is used on the first and second zones. Using the entirety of the stress budget on the first and second zones results in a glass article that is under tensile stress for normal usage, but has improved capacity to prevent or reduce damage caused by an impact to the article. Also note that the first and second zones can form a continuous perimeter around the third zone.

Figure 21:
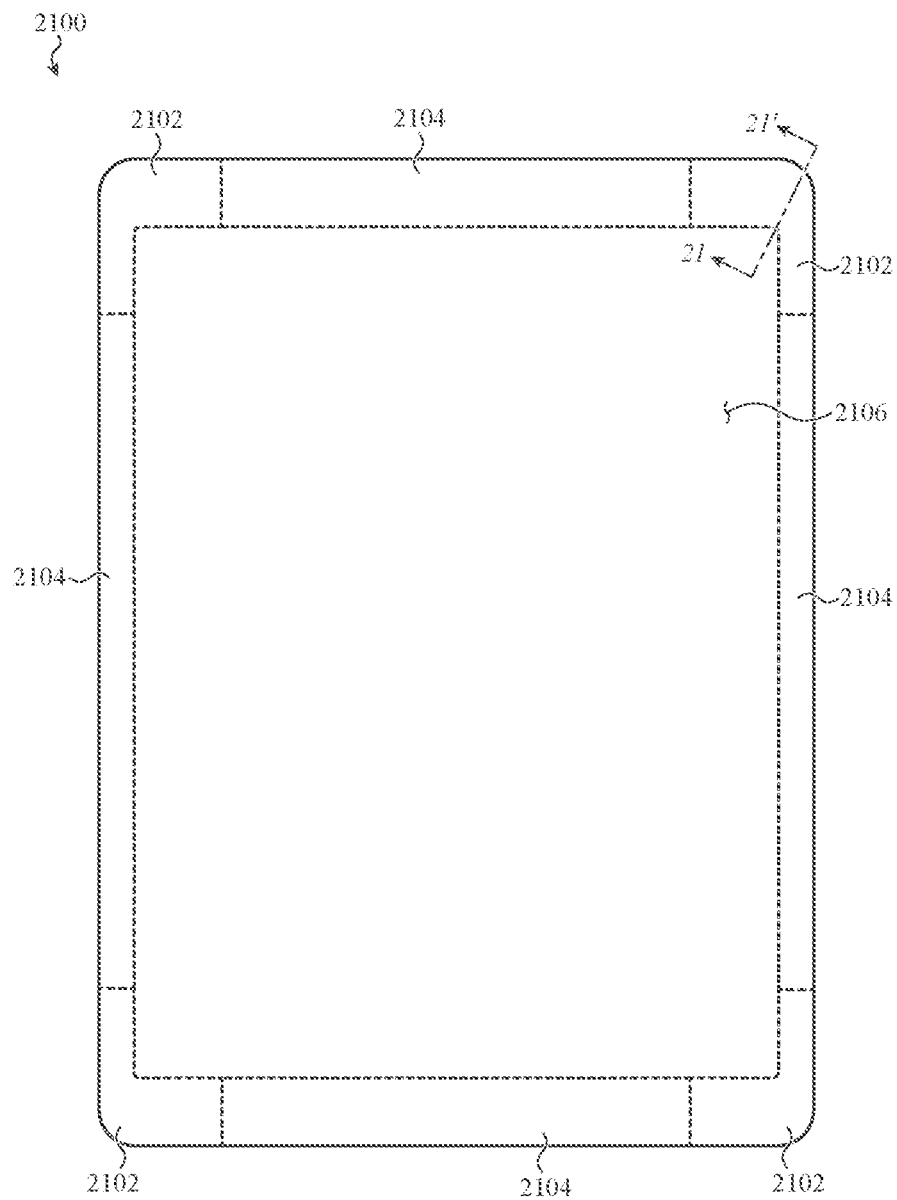
FIG. 21 shows a diagram of a cover glass in accordance with embodiments herein.

FIG. 21 illustrates a cover glass 2100 having three zones, each zone having a stress pattern useful in reducing damage, or the propagation of damage, in a cover glass. As noted above, a finite stress budget exists for the cover glass 2100. The stress budget is allocated to each of the three zones, where the first zone 2102 (corresponding to the corner portions or areas of the cover glass) receives the highest amount of chemical strengthening, a second zone 2104 (corresponding to the straight perimeter sides or peripheral edge areas) receives the second highest amount of chemical strengthening, and a third zone 2106 that corresponds to the center or remainder area of the cover glass 2100 receives the least amount of chemical strengthening. In some embodiments, the third zone 1906 may undergo little or no chemical strengthening. The third zone 2106 can include an external surface where a portion thereof is typically substantially flat, rather than the entirety of the third zone. The third zone 2106 is also surrounded by the higher strengthened first 2102 and second 2104 zones, which form a contiguous perimeter around the third zone. The contiguous first and second zones forming at the periphery of the cover glass higher strength glass that forms a protective barrier against impact to the lower strengthened glass found in the third zone. In some embodiments, the first zone and second zone each form an edge and the edges can contact each other to form an oblique angle. The stress budget is used to reduce potential impact events from causing damage, or the propagation of damage, to the first zone 2102, and to some lesser extent, the second zone 2104, while leaving the third zone substantially flat or unaffected by warpage. At the least, impact is likely to be distributed to the first and second zones of the cover glass 2100, which form a perimeter around and surround the centrally located third zone 2106. In addition, the first zone can be thermally heated to a temperature that allows for increased chemical strengthening as compared to the same zone in the absence of thermal heating. The second zone may also be thermally heated during asymmetric strengthening to also enhance or increase the amount of stress induced in the zone. Thermal heating is described throughout the current specification, but can be performed by microwave or laser heating. In some embodiments, the temperature of the thermal heating is below the densification temperature of the glass and in other embodiments the temperature of the thermal heating is above the densification temperature of the glass.

Figure 22:
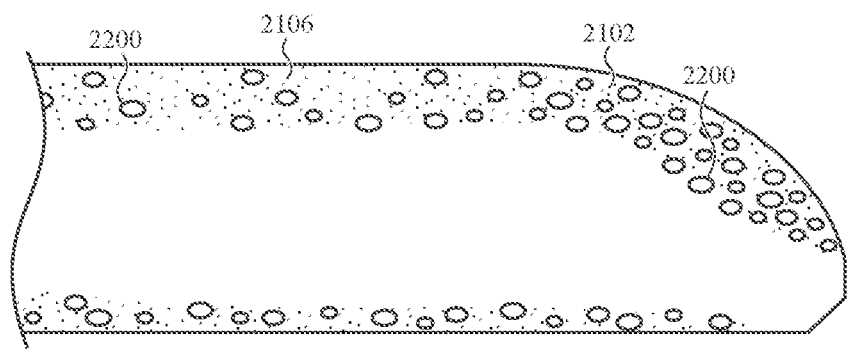
FIG. 22 shows a cross-sectional view of the corner in FIG. 19 to illustrate asymmetric chemical strengthening.

FIG. 22 shows a cross-sectional view along line 21-21' in FIG. 21. The first zone 2102 shows an increased amount of ions 2200 to a particular depth and concentration as compared to the third zone 2106. The change in ion concentration along the first zone surface, and to particular depths, modifies the glass internal stress relationship. The increased chemical strengthening to the first zone provides additional compressive stress along the zone or portion of the cover glass most likely to have an impact. In FIG. 22 the first zone defines a curved edge, which in this embodiment, extends from the top surface to the bottom surface of the cover glass. Note that this is also the zone of the cover glass most at risk from impact, as it has a limited area to distribute force or energy caused by the impact. The increase in the volume of ions at the corner can thereby resist the force or energy imparted by the impact and reduce or prevent damage to the cover glass. Alternatively, the third zone 2106 has a much greater area to distribute a force associated with an impact, as well as being much less likely to be involved with the impact itself. As such, some of the chemical strengthening not required in the third zone can be budgeted to the first zone and still maintain a cover glass within its budgeted amount of stress. As noted in FIG. 22, the third zone defines an external surface that is substantially flat.

Flattening Asymmetric Stress Profiles

Embodiments herein include the process of using asymmetric chemical strengthening, in combination with other compensating forces, to provide useful glass articles, for example, articles having flat surfaces.

In one embodiment, a glass article that has been asymmetrically chemically strengthened shows a stress imbalance due to an overall excess of compressive stress on the top surface as compared to the bottom surface, for example. The stress imbalance in the glass article can be counteracted by attachment to a very stiff material, or a stiff material having a geometry that counteracts the stress imparted by the asymmetrically strengthened glass article. Optimal materials would counteract the glass article's imparted asymmetric stress so as to remain flat (or remain at the geometry required for the glass material). In typical embodiments, the stiff material would be attached along the surface of the glass article, typically the bottom surface. In some cases, the stiff material would be transparent. The stiff material would only need to be of sufficient amount and coverage to accomplish the counteracting stress.

In another embodiment, a glass article that has been asymmetrical chemical strengthened has its stress imbalance counterbalanced by tailoring mechanical or chemical removal of material. In this embodiment, polishing or other mechanical technique can be used to optimally remove stress from the glass article. Alternatively, aspects of the glass article's stress imbalance can be removed by immersion of the part in chemical removal bath, e.g., an HF bath. Glass surface not at issue in the chemical removal bath could be sealed off from the HF or only selective regions of the glass surface exposed to the HF. Removal of material would be accomplished to provide a glass article with the correct geometry or flatness (again based on counterbalancing the overall stress in the strengthened glass article).

In still another embodiment, the required asymmetric compressive stress (for damage control and reliability) is counteracted by the introduction of additional, localized, chemical strengthening. For example, use of coatings or pastes (previously described) can be incorporated into the asymmetrically strengthened glass article to counteract the warpage introduced by the required asymmetric chemical strengthening. In some aspects, the coatings or pastes can be patterned.

Embodiments herein also include not just the placement of counteracting chemical strengthening, but include the amount of compressive surface stress and the depth of compression of the chemical strengthening on the glass. Here, the inclusion of a particular compressive surface stress can act as a stiffening barrier to prevent or counteract warpage introduced by other asymmetric chemical strengthening. Use of a short, high spike of potassium ions, for example, into the surface of the glass article can act to provide a very shallow but hard sport. These hard (high compressive surface stress layers) can have a Young's Modulus as high as 60 to 80 GPa and be used to prevent warpage—in a sense, act as the stiff material discussed above.

Compensating Asymmetric Chemical Strengthening With Forming

Embodiments herein include the design and production of glass articles that combine the advantages of asymmetric strengthening of surfaces on a glass article, with glass forming.

As is described throughout the present disclosure, asymmetric chemical strengthening allows for targeted increases in either the compressive surface stress of a glass article and/or the depth of compression of a glass surface. In most cases, the glass article is calibrated to have its intended utility with maximum damage or scratch protection for the glass article. This typically requires some combination of the processes and embodiments described herein, for example, increased depth of compression along the perimeter of a cover glass with normal symmetric chemical strengthening in the center of the cover glass.

Inclusion of asymmetric chemical strengthening, however, can introduce stress imbalance into the glass article (note the stress profiles discussed above). When enough stress imbalance is introduced to a glass article, the glass article will warp. Warpage in a glass article is typically detrimental to the article's utility and presents a limitation on how much asymmetric stress can be introduced into a glass article.

As previously discussed, introduced warpage can be compensated for by introduction of competing stress imbalances, for example, introducing asymmetric chemical strengthening in a glass article so as to both provide utility and to provide counteracting stress. The present embodiment, however, utilizes the glass forming process to minimize the stress imbalances introduced by asymmetric chemical strengthening. Further, glass forming provides a stiffer glass article which can be formed to combine with the forces incurred through asymmetric chemical strengthening to yield a glass article having the desired shape.

In one embodiment, a glass article is designed to counteract the stress imbalances introduced by asymmetric chemical strengthening with the use of glass forming. In one aspect the asymmetric chemical strengthening is counteracted by forming the glass article with an appropriate geometry. Appropriate glass article geometries for a particular stress profile provide stiffness to counteract the stress introduced by the asymmetric chemical strengthening procedures. In an alternative embodiment, the asymmetric chemical strengthening is combined with glass forming to provide a desired geometry, for example, the warpage of the strengthening is combined with glass forming curvature to yield a desired shape.

Where a desired glass article shape entails a non-uniform cross-sectional shape, or thickness, symmetric chemical strengthening would actually contribute to a wider-spread potential warpage. Asymmetric chemical strengthening allows for both inclusion of the desired compressive stress layers and depth and avoids the significant warpage. Glass forming combines with the strengthening to provide an optimized glass article.

Figure 23:
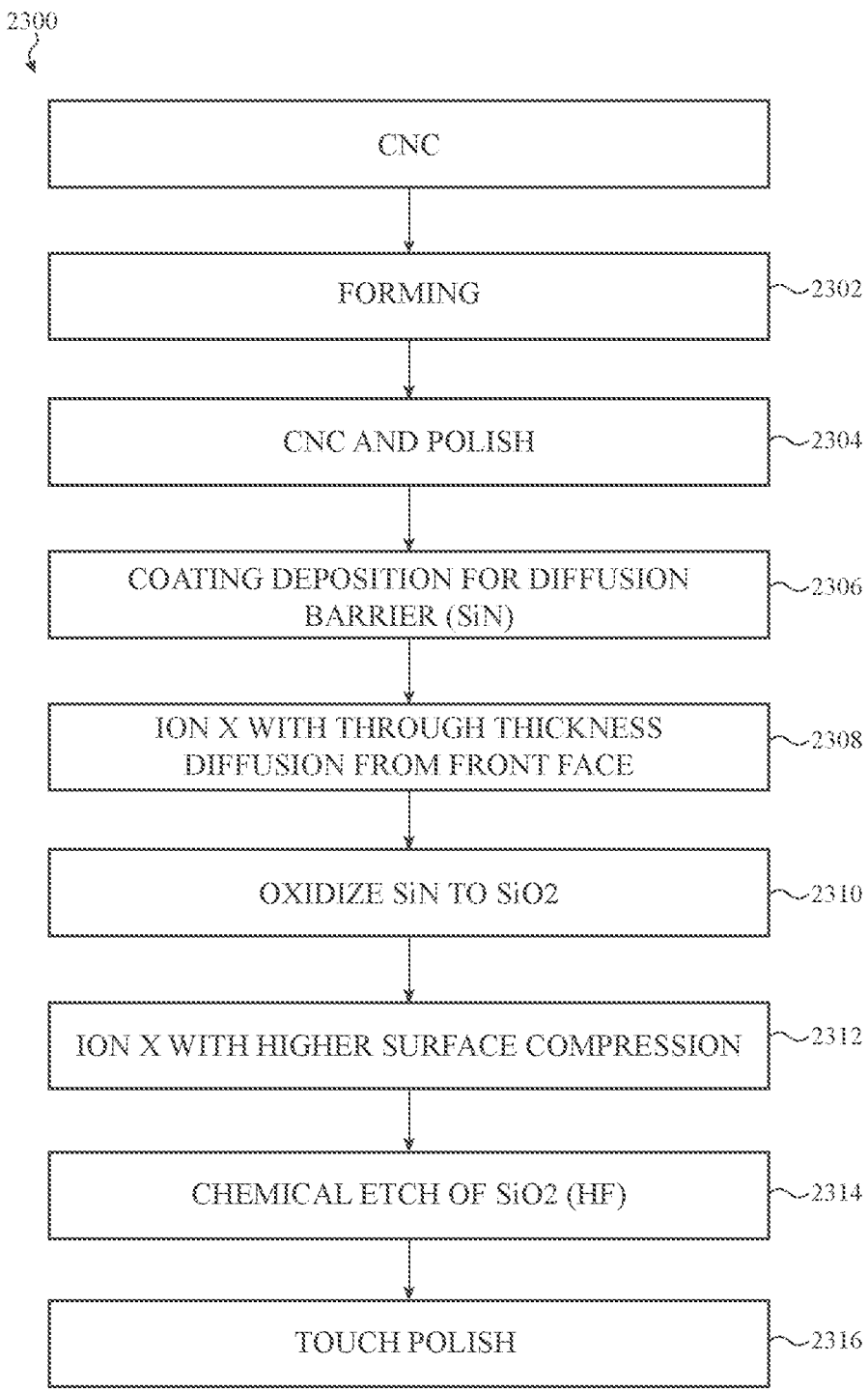
FIG. 23 is a flow diagram for compensating for asymmetric chemical strengthening with glass forming techniques in accordance with embodiments herein.

FIG. 23 is a flow chart illustrating that a glass article can be identified and formed with the appropriate local stiffness to counteract the proposed asymmetric chemical strengthening 2300. The formed glass 2302 can undergo CNS and polishing 2304. The glass article then undergoes the various steps required to introduce the asymmetric chemical strengthening, including, for example, the use of barrier layers, pastes, heat, etc. (2306, 2308, 2310, 2312, 2314 and 2316). The formed glass article with enhanced stiffness can be treated multiple times to obtain a highly calibrated surface or surface.

Optimized Glass Article Design Based on Stress Distribution

Embodiments herein include processes for calibrating the strength of a glass article for a particular use using any one or more of: pre-heating a glass article to a higher glass density, modifying the edge geometries of a glass article to maximize geometric strengthening, modified chemical strengthening using masking, ion barrier or limiting coatings, chemical strengthening using ion enhancing pastes and heat, thermally assisting the chemical strengthening, directed or preferred ion diffusion using electric fields and heat, introducing pre-stress to target articles, and tuning the stress found in asymmetrically prepared glass articles.

Calibration can also occur during the glass manufacturing process, for example, through differential strengthening of glass in clad layers, through identification of useful ion gradients and concentrations in starting glass, and through fusing glass articles together, and the like.

Aspects herein utilize each of the above embodiments to calibrate a glass article, having a budgeted amount of stress, in the vertical and horizontal axis. Budgeted and irregular stress allows for placement of compressive stress layers of predetermined hardness and depth on the front, back, top, sides and edges of a glass article to both optimize the reliability of the glass article and to make the glass article safe for its intended use. Budgeted irregular stress in the glass article can also be offset by counteracting stress input by other materials, or by the geometry of the glass itself. This is particularly useful when the finished glass article is designed to be flat or other targeted geometry. In this manner a glass cover, for example, can be evaluated for its intended use, i.e., how much surface compressive stress does the article require on the top surface, bottom surface, edges, etc., how deep does the compressive stress need to extend at each of these zones, how much tensile strength will result from these compressive stress needs, how much tensile strength will result, can the required stresses be balanced using chemical strengthening alone, can glass forming be used, and the like. Embodiments herein are then utilized to perform the calibration to provide a high utility glass cover with maximized or optimized value.

The following Example is provided for illustrative purposes only and is not intended to limit the scope of the disclosure.

Example of Glass Forming to Compensate for Asymmetric Chemical Strengthening

The depth of compression in ion-exchange chemical strengthening is correlated to the ability of a glass article to resist failure by damage induction. In this light, maximizing the depth of compression is a significant driver in producing more durable and reliable glass for use in portable electronic devices.

Depth of compression in a glass article saturates once the ions have been diffused through the thickness of the glass. This shows that asymmetric strengthening can be used to achieve a deeper depth of compression, and thereby facilitate a glass article's ability to resist failure. Further, although asymmetric strengthening introduces warpage via a stress imbalance in the glass article, the warpage can be compensated for by using glass forming.

The use of glass forming includes using stiffer cover glass designs, as well as forming a cover glass geometry to compensate for the introduced asymmetric warpage. For example, glass forming can be used to compensate or exacerbate the asymmetric chemical strengthening stresses to ensure that the combined procedures results in the desired final part shape.

Figure 24:
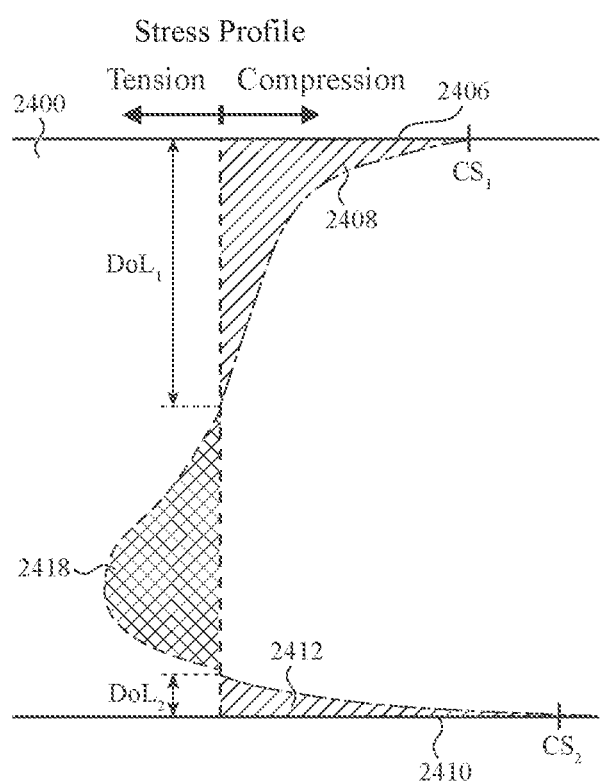
FIG. 24 illustrates a stress profile for an asymmetrically strengthened cover glass.

Depth of compression can be implemented into a cover glass by using one or more of the asymmetric chemical strengthening processes described herein. FIG. 24 provides an example of an asymmetrically strengthened cover glass chemically strengthened to a greater depth of layer at the exterior surface and to a greater compressive surface stress at the interior surface. As shown in FIG. 24, cover glass 2400 includes a first compressive stress region 2408 which extends from exterior surface 2406 to a first depth $DoL_1$ and has a first compressive surface stress $CS_1$. In FIG. 24, the first depth $DoL_1$ extends about to a midpoint of the thickness of the cover glass 2400. The glass cover further includes a second compressive stress region 2412 which extends from interior surface 2410 to a second depth $DoL_2$ and has a second compressive surface stress $CS_2$. As shown, the first depth $DoL_1$ is greater than the second depth $DoL_2$ and the first compressive surface stress $CS_1$ is less than the second compressive surface stress $CS_2$. In embodiments, the surface compressive stress $CS_2$ along an interior surface of the cover glass 2400 may be from 600 MPa to 800 MPa and the surface compressive stress $CS_1$ along an exterior surface may be from 300 MPa to less than 600 MPa. In additional embodiments, the first depth $DoL_1$ may be from 75 microns to 175 microns and the second depth $DoL_2$ may be from 10 microns to 50 microns. In further embodiments, the first depth $DoL_1$ may be from 1.5 to 8 times or from 1.5 to 5 times the second depth $DoL_2$. The cover glass 2400 has a corresponding, but budgeted amount of tensile stress 2418 to offset the exterior and interior asymmetric surface compression.

FIGS. 25-30 illustrate one such asymmetric chemical strengthening and glass forming procedure.

Figure 25:
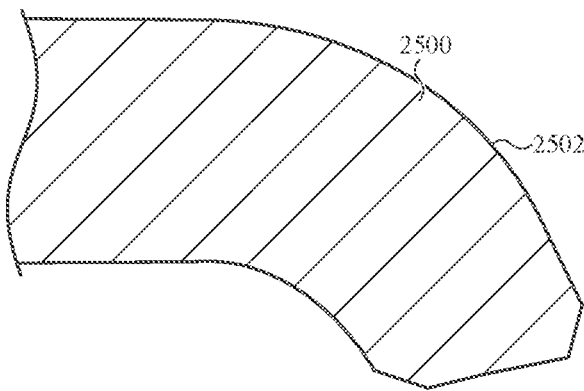
FIG. 25 illustrates a glass article formed to a predetermined geometry in accordance with embodiments herein.

In FIG. 25, a glass cover is obtained and undergoes CNC to fit its basic design needs. A cross section view shows the initial cover glass geometry. FIG. 25 shows that glass forming can be used to introduce a bend 2502 (via bending stress) at the end of the cover glass 2500. Note that symmetric chemical strengthening of this formed glass would result in a highly warped glass article, and provide little value.

Figure 26:
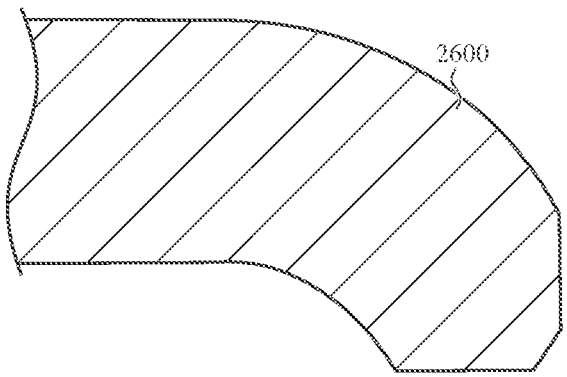
FIG. 26 illustrates a glass article, after forming, subjected to CNC and polishing in accordance with embodiments herein.
Figure 27:
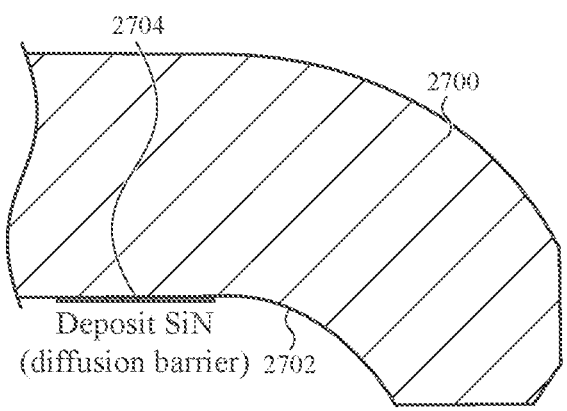
FIG. 27 illustrates the glass article, after forming and CNC, locally coated with a diffusion barrier (SiN) in accordance with embodiments herein.

In FIG. 26, the cover glass 2600 can undergo further CNC and polishing to further prepare the cover glass. Next, in FIG. 27, the bottom flat surface 2702 of the cover glass 2700, up to the formed bend, is coated with a layer of an ion-exchange diffusion barrier, silicon nitride (e.g. SiN) 2704. The silicon nitride will significantly limit ion diffusion through the flat bottom surface of the cover glass. This will further ensure that the covered surface remains substantially flat.

Figure 28A:
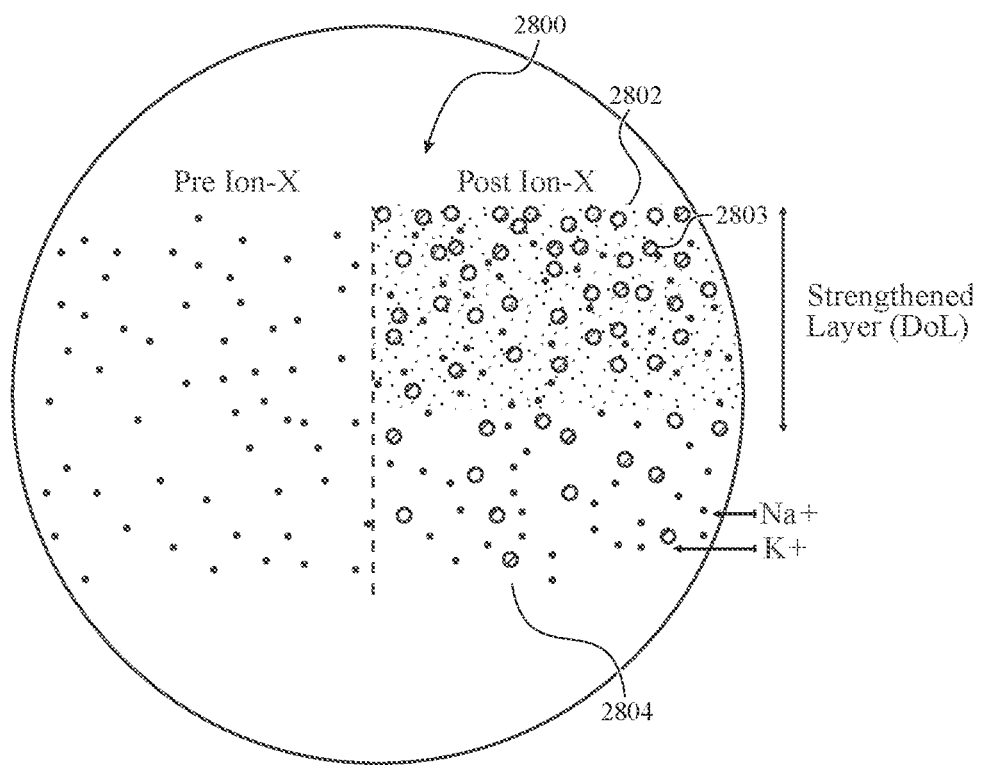
FIGS. 28A and 28B illustrate asymmetric chemical strengthening of the glass article of FIG. 12 in accordance with embodiments herein.
Figure 28B:
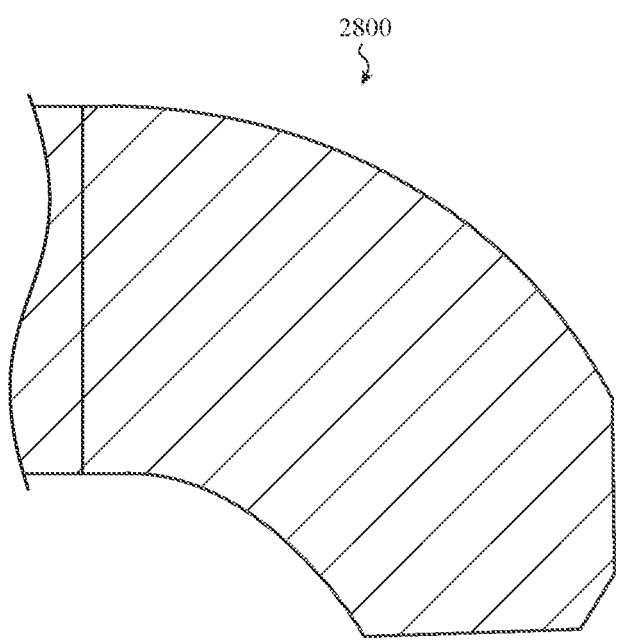

The formed and partially masked cover glass is treated under the chemical strengthening process described herein in FIGS. 28A and 28B. As can be seen from FIG. 28A, a cross section of the glass 2800 indicates that the top surface 2802 of the cover glass has a compression layer of depth DoL formed by diffusion of potassium 2803. The bottom surface 2804, coated by the silicon nitride has no, or very minimal, chemical strengthening, as expected. FIG. 28B shows a cross-sectional view of the status of the formed cover glass 2800.

Figure 28C:
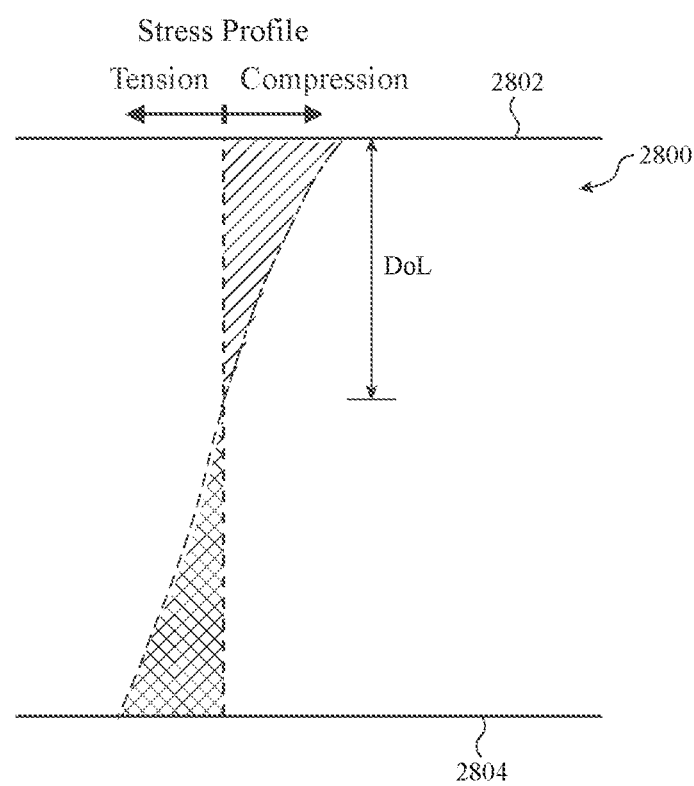
FIG. 28C is a stress profile in accordance with the glass article shown in FIG. 23A.

FIG. 28C is the corresponding stress profile, where the top surface 2802 of the glass cover 2800 shows a high compressive stress and significant DoL and the bottom cover 2804, where there was no strengthening, shows no compression and only tensile stress (that results from balancing the stress at the top surface).

Figure 29A:
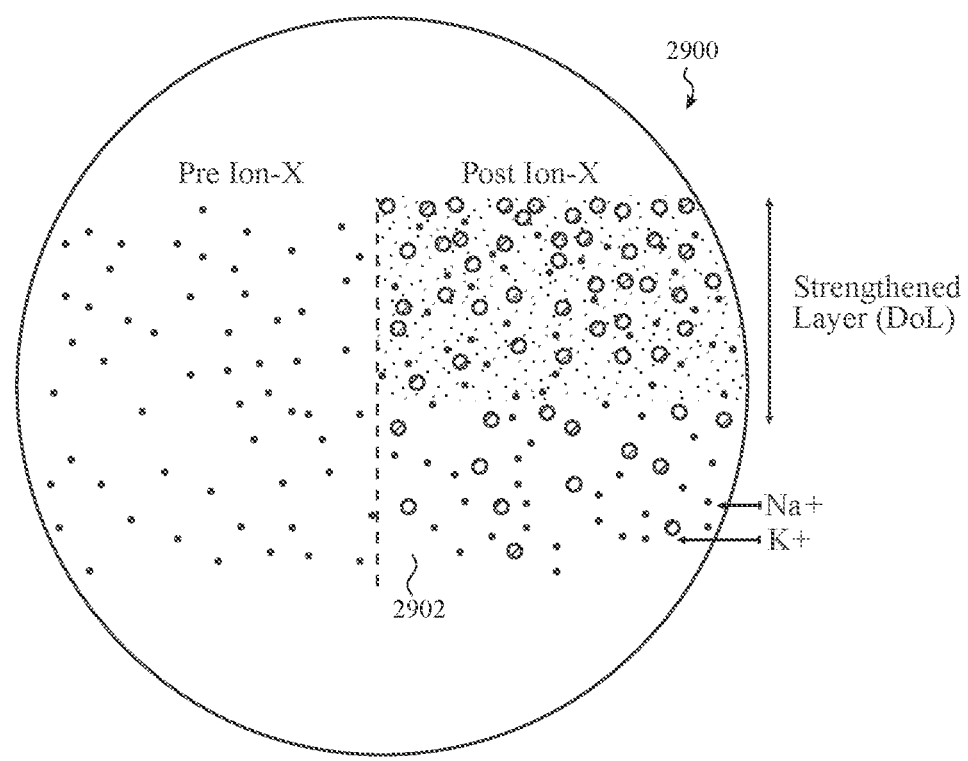
FIGS. 29A and 29B illustrate oxidation of the silicon nitride layer on a glass article to $SiO_2$ in accordance with embodiments herein.
Figure 29B:
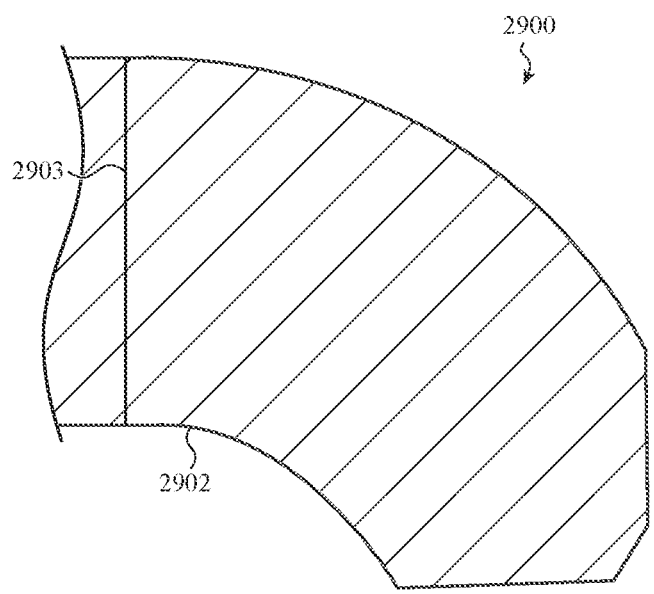
Figure 30A:
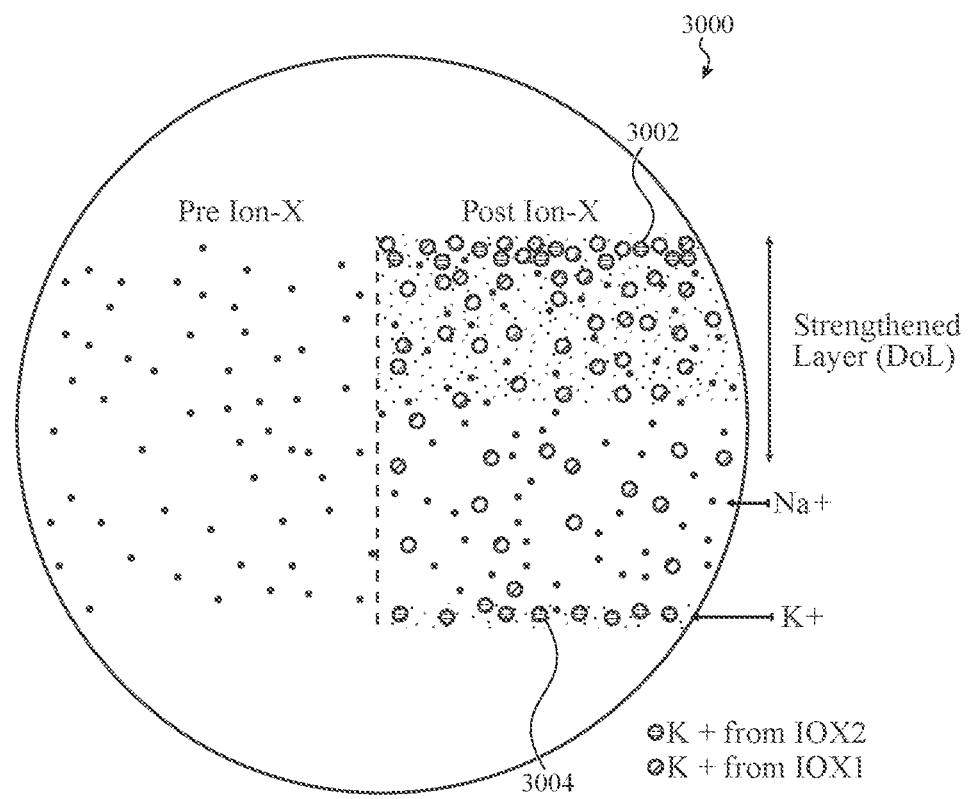
FIGS. 30A and 30B illustrate asymmetric chemical strengthening to a formed glass article in accordance with embodiments herein.

FIGS. 29A and 29B illustrate that the silicon nitride layer on the bottom surface of the glass cover 2900 can be oxidized to $SiO_2$ 2902, which is no longer a complete barrier to chemical strengthening. A second round of chemical strengthening is performed on the formed glass cover to provide the cross sectional view shown in FIG. 30A. Note that the bottom surface 3004 now includes a shallow compressive layer, while the top surface 3002 has been further enhanced with a higher surface compression (FIG. 30A).

Figure 30B:
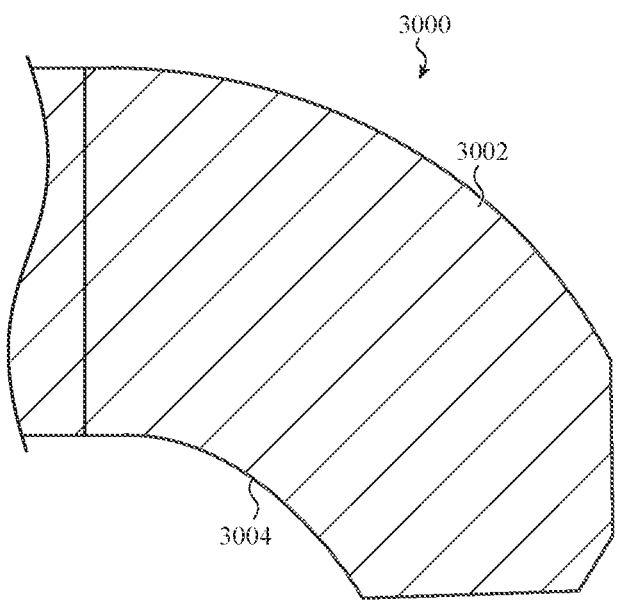

Finally, FIG. 30B illustrates the final cover glass 3000 that includes a cover glass geometry to complement an asymmetric stress profile from the series of chemical strengthening procedures. The cover glass has excellent top cover surface compression 3002 and DoL, matched by the geometry and high compressive stress with limited DoL of the bottom surface 3004 (see FIG. 30B).

Figure 30C:
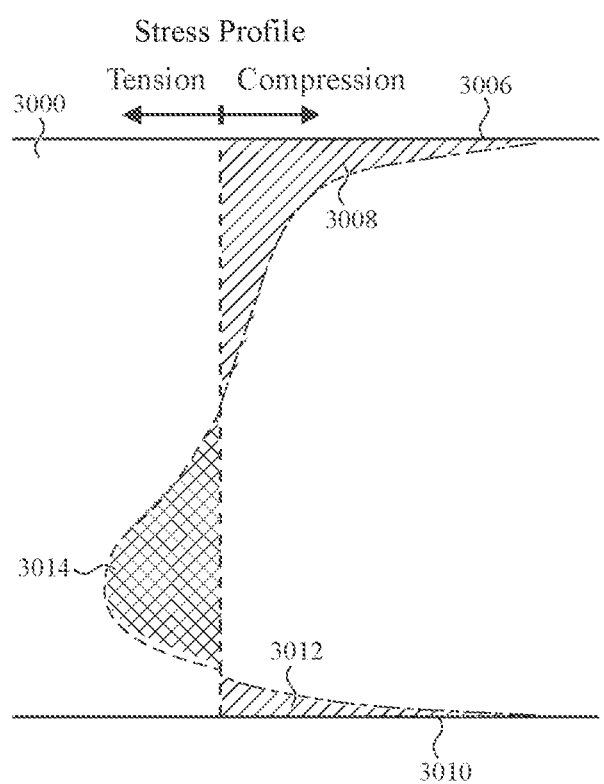
FIG. 30C is a stress profile in accordance with the glass article shown in FIG. 30A.

FIG. 30C is the corresponding stress profile, where the top surface 3006 of the glass cover 3000 shows high surface compression 3008. The bottom surface 3010 shows some amount of surface compression 3012, corresponding to the lower allowance of chemical strengthening. The cover glass 3000 has a corresponding, but budgeted amount of tensile stress 3014 to offset the top and bottom asymmetric surface compression.

Asymmetric Strengthening of Glass Articles With Non-Uniform Thickness

As discussed briefly above, an asymmetrically chemically strengthened glass article may have portions of different thickness from one another. Generally, thicker portions of the glass article may be chemically strengthened to a deeper depth of layer (DoL) than thinner portions. By asymmetrically chemically strengthening the glass, the thicker portions may be made more crack- and/or impact-resistant than the thinner portions, while ensuring that no portion of the glass article shatters or releases fragments upon impact or cracking. Thus, the glass article may have portions with different degrees of chemical strengthening, such that thicker portions may be more crack resistant while thinner portions have some, but less, crack resistance.

In some embodiments, a peripheral portion of the glass article may be thicker while a central portion is thinner, for example to provide additional space in an electronic device enclosure to accommodate internal components of the electronic device. The peripheral portion, which is more likely to be impacted as a result of dropping the electronic device, may have its resistance to cracking, chipping, or otherwise breaking enhanced by a deeper chemical strengthening layer (as measured from an exterior surface of the glass article) while maintaining overall safety and reliability of the glass article.

FIGS. 31-34B illustrate sample embodiments of glass articles having portions of different thickness and each will be discussed in turn. In embodiments, a first portion of the glass article may have a first thickness and the second portion of the glass article may have a second thickness greater than the first thickness. In further embodiments, a central zone of the glass article may have the first thickness and a peripheral zone of the glass article may have the greater second thickness. In additional embodiments, the central zone of the glass article may define the first portion and the second portion and the glass article may further comprise a peripheral zone.

The thickness of a given portion of the glass article may be defined between a region of an exterior surface and a corresponding region of the interior surface. For example, a thickness may be defined between a front region of the exterior surface and a corresponding rear region of the interior surface. When a region of a surface defines a curve, a thickness may be defined along a perpendicular to the curved region of the surface.

In further embodiments, the glass article may define a lateral thickness. For example, when the glass article includes a thinner central portion and a thicker peripheral portion, the peripheral portion may define the lateral thickness. In particular, when the interior surface varies in elevation, as illustrated in FIGS. 32A-33B and 34B, the peripheral portion of the glass article may define a lateral thickness between a side region of the exterior surface (i.e. a side surface) and a corresponding transition region of the interior surface.

Figure 31:
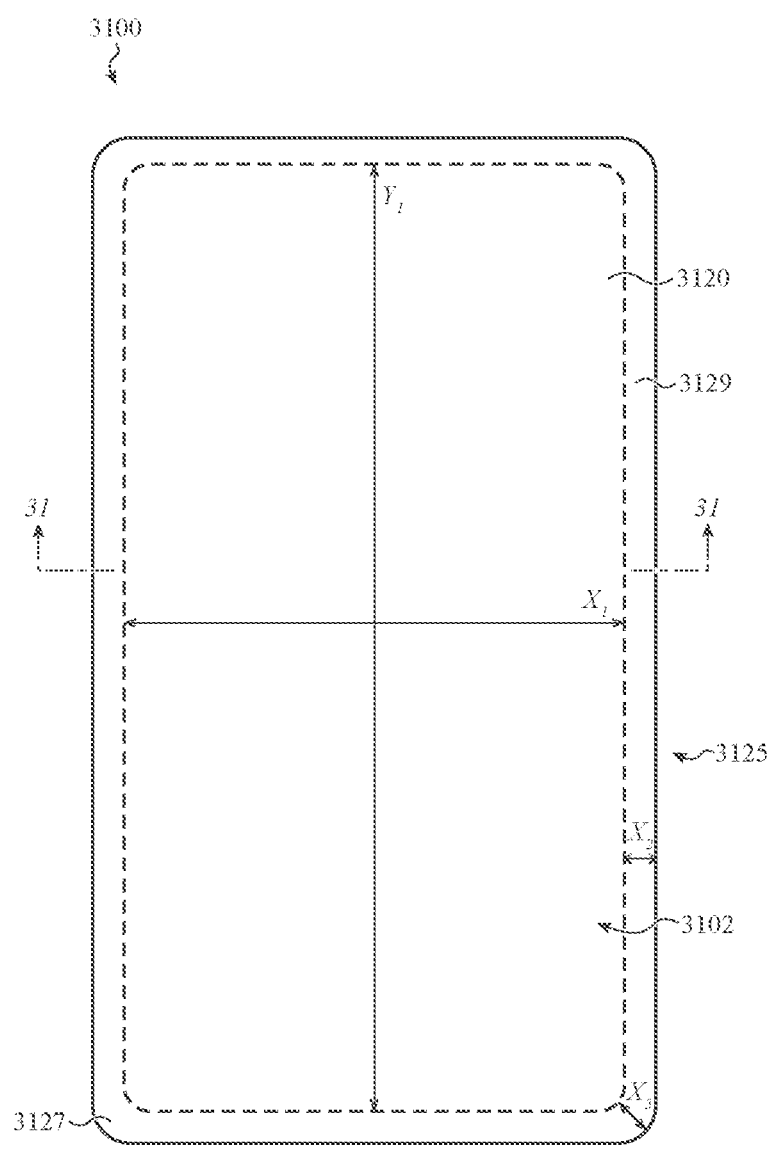
FIG. 31 is a top view of a glass article having a central zone and a peripheral zone.

FIG. 31 is a top view of a sample glass article 3100, showing a thicker peripheral portion 3125 and a thinner central portion 3120. Central portion 3120 and a region of peripheral portion 3125 are generally coplanar at exterior surface 3102. The transition between the peripheral portion 3125 and central portion 3120 is shown by a phantom line corresponding to the step transition in thickness at the interior surface illustrated in the cross-section of FIG. 32A, discussed below. The thicker peripheral portion 3125 and thinner central portion 3120 are contiguous with one another, meaning that the two regions or portions about one another with no intervening structure.

Figure 32A:
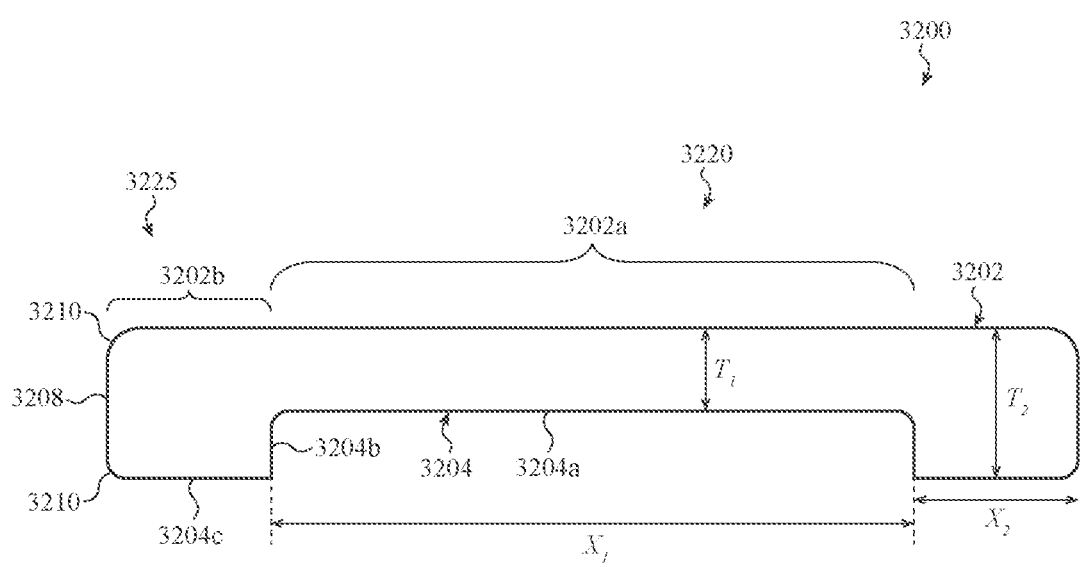
FIG. 32A is a simplified cross-section view of a glass article having a central portion which is thinner than a peripheral portion.

The central portion 3120 shown in FIG. 31 is bounded by the peripheral portion 3125 of the glass article 3100 and has width W1 and length L1. Central portion 3120 is not confined to a midpoint of the glass article, but extends to an interior surface and an exterior surface of the glass article, as shown in FIG. 32A. An exterior surface of central portion 3120 may be generally planar.

In embodiments, a peripheral portion of the glass article includes a periphery of the glass article. By the way of example, the peripheral portion may include a side surface of the glass article. As illustrated in FIG. 31, peripheral portion 3125 includes corner portion 3127 and remainder portion 3129. Peripheral portion 3125 has a lateral thickness $X_3$ in corner portion 3127 and a lateral thickness $X_2$ in remainder portion 3129. The lateral thicknesses $X_2$ and $X_3$ may be measured along a plane parallel to that of the central portion. As shown, the lateral thickness $X_3$ in the corner zone may be greater than the lateral thickness $X_2$ in the remainder portion. In addition, lateral thickness of the peripheral portion of the glass may be greater than a thickness of the central portion. In embodiments, an exterior surface of peripheral portion 3125 is generally coplanar with an exterior surface of central portion 3120. In some embodiments, the exterior surface of peripheral portion 3125 includes a curved region.

The glass article 3100 may be used as a cover glass, portion of a housing, input surface, and so on of an electronic device. Accordingly, the shape and/or dimensions of the glass article 3100 are intended to illustrate general concepts as opposed to a particular requirement. The glass article 3100 may be transparent, translucent or opaque.

FIG. 32A is a cross-section taken along line 31-31 of FIG. 31 of an example glass article 3200. The thicker peripheral portion 3225 and thinner central portion 3220 of the glass article 3200 are contiguous. As shown, the peripheral portion 3225 steps down to the central portion 3220 (e.g., transitions to a lesser thickness).

The exterior surface 3202 of the glass article includes a central exterior surface 3202a in the central portion and peripheral exterior surface 3202b in the peripheral portion. The interior surface 3204 of the article includes central interior surface 3204a in the central portion, peripheral interior surface 3204c in the peripheral portion, and transitional interior surface 3204b at the transition in thickness between the central portion and the peripheral portion. Alternately, transitional interior surface 3204b may be referred to as a wall surface. As shown, central exterior surface 3202a is generally opposite central interior surface 3204a and peripheral exterior surface 3202b is generally opposite peripheral interior surface 3204c. One edge 3210 provides a transition between the peripheral exterior surface 3202b and side surface 3208 while another edge 3210 provides a transition between peripheral interior surface 3204c and side surface 3208.

As shown in FIG. 32A, the central portion 3220 of the glass article defines central exterior surface 3202a and central interior surface 3204a. The central portion 3220 has a thickness $T_1$ between central exterior surface 3202a and central interior surface 3204b. The thickness $T_1$ shown in FIG. 32 is substantially constant, but in further embodiments the thickness in central portion 3220 may vary.

The peripheral portion 3225 of the glass article of FIG. 32A defines peripheral exterior surface 3202b, edges 3210, side surface 3208, peripheral interior surface 3204c, and transitional interior surface 3404b. The peripheral portion has a thickness $T_2$ between peripheral exterior surface 3202b and peripheral interior surface 3204c. In addition, the peripheral portion has a lateral thickness $X_2$ between transitional interior surface 3204b and side surface 3208. In embodiments, thickness $T_1$ is at least 10%, 20%, 30%, 40%, or 50% of thickness $T_2$. The thickness $T_1$ may be up to 70% of thickness $T_2$. The lateral thickness $X_2$ may also be greater than $T_1$. In embodiments, thickness $T_1$ is 20%, 30%, 40%, 50%, 60% or up to 70% of lateral thickness $X_2$. When the lateral thickness $X_3$ of the corner portion is greater than the lateral thickness $X_2$ of a remainder of the peripheral portion, the thickness $T_1$ may be 10%, 20%, 30%, 40%, or up to 50%, of lateral thickness $X_3$.

As previously discussed, the glass article may be chemically strengthened by ion exchange to form a compressive stress layer at surfaces of the glass article. The depth of layer (DoL) and/or the compressive surface stress (CS) may be different for different surfaces of the glass article. In additional embodiments, the compressive stress layer may have the same DoL and CS at some surfaces of the glass article. Further, as previously described, formation of a compressive stress layer along surfaces of the glass article creates a tensile stress region inside the glass article which balances the compressive stresses.

In aspects disclosed herein, the glass article 3200 is asymmetrically chemically strengthened such that the depth of the compressive stress layer (DoL) varies around the glass article 3200. In embodiments, a depth of the compressive stress layer in a thicker portion of the glass article is greater than a depth of the compressive stress layer in a thinner portion of the glass article. In further embodiments, the compressive surface stress (CS) may be different for different surfaces of the glass article 3200. FIGS. 32B-32C, 33B, and 34B illustrate examples of compressive stress layers formed in glass articles having portions of different thickness. In FIGS. 32B-32C, 33B, and 34B the compressive stress layer is indicated by a dashed line and stippling, both of which are not intended to illustrate any particular material, ion density, or other quality other than depth of layer.

In embodiments, the compressive stress layer may differ in the central portion and the peripheral portion of the glass article. In further embodiments, the compressive stress layer along the exterior surface of the glass article may differ in the central portion and the peripheral portion of the glass article. For example, a depth of the compressive stress layer along the exterior surface in the peripheral portion of the article may be greater than a depth of the compressive stress layer along the exterior surface in a central portion of the article, as illustrated in FIG. 32C. In additional embodiments, a depth of the compressive stress layer along the exterior surface of the peripheral portion of the article may be about the same as a depth of the compressive stress layer along the exterior surface of the central portion of the article, as illustrated in FIG. 32B.

In further embodiments, the compressive stress layer along a side surface of the peripheral portion may have a depth which is the same or which is different than the depth of the compressive stress layer along at least one of an exterior surface and an interior surface of the peripheral portion. As one example, the compressive stress layer along the side surface 3208 may have a depth which is about the same as the depth of the compressive stress layer along the exterior surface 3202a, as illustrated in FIG. 32C. As another example, the compressive stress layer along side surface 3208 may have a depth which is different that a depth of the compressive layer along each of exterior surface 3202a and interior surface 3204c.

Figure 32B:
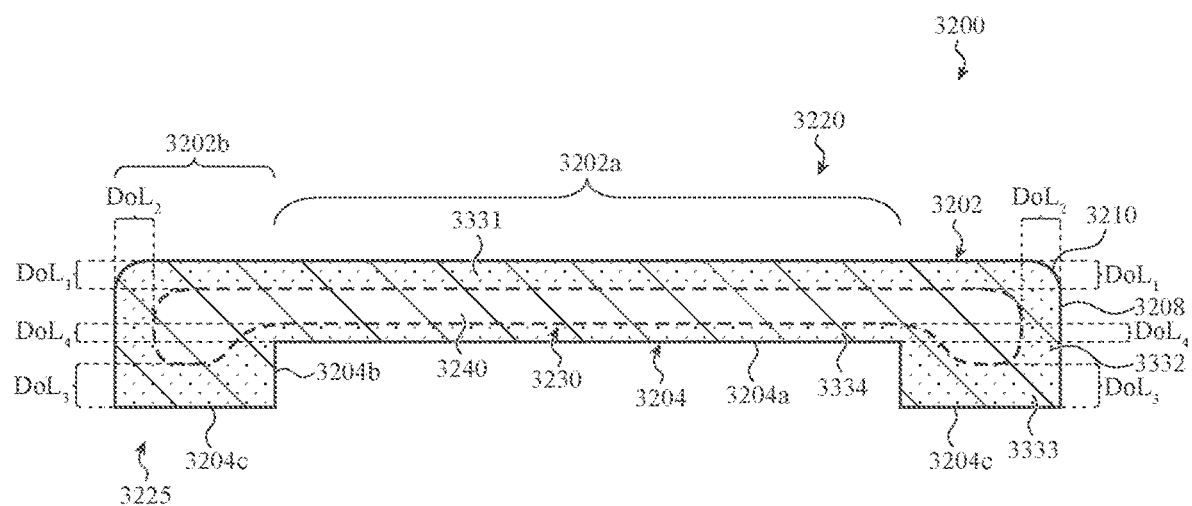
FIGS. 32B and 32C illustrate examples of compressive stress regions formed in the central portion and the peripheral portion of the glass article of FIG. 32A.
Figure 32C:
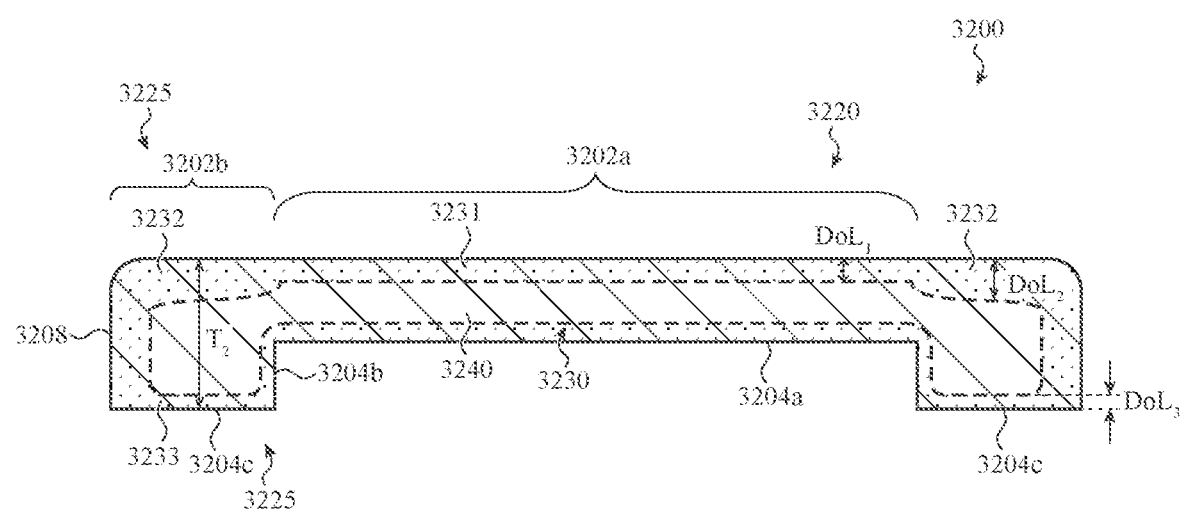

The compressive stress layer along an interior surface of the glass article at the transition in thickness between the peripheral portion and the central portion may be largely influenced by the compressive stress layer along the adjacent interior surface of the peripheral portion and the adjacent interior surface of the central portion, as illustrated in FIG. 32B. In embodiments, the compressive stress layer along the interior surface at the transition in thickness may be significantly different than the compressive stress layer along the side surface of the glass article. For example, a depth of the compressive stress layer along the interior surface at the transition in thickness may be less than a depth of the compressive stress layer along the side surface as shown in FIG. 32C.

In embodiments, a compressive stress layer along a region of the exterior surface in the central portion is different than the compressive stress layer along a region of the interior surface in the central portion. For example, the compressive stress layer along central exterior surface 3202a may have a depth greater than a depth of central interior surface 3204a. FIGS. 32B and 32C illustrate examples of such compressive stress layers 3230 formed in the central portion of the glass article. Tensile stress region 3240 is also shown.

In additional embodiments, the compressive stress layer along a region of the exterior surface of the peripheral portion of the glass article is different than the compressive stress layer along a region of the interior surface. As one example, the compressive stress layer along the peripheral exterior surface 3202b may have a depth (i.e., depth of layer) less than a depth of the peripheral interior surface 3204c, as illustrated in FIG. 32B. Alternately, the compressive stress layer along the peripheral exterior surface 3202b may have a depth greater than a depth of peripheral interior surface 3204c, as illustrated in FIG. 32B.

As previously discussed, the internal tensile stress region may have a thickness which limits the central tension within the glass article. In embodiments, the thickness of the internal tensile stress region may be referenced to a thickness of the glass article. For example, the thickness of the internal tensile stress region in the peripheral portion of the glass article may be referenced to a thickness of the peripheral portion. In embodiments, the thickness of the internal tensile stress region in the peripheral region is at least 10%, 20%, or 30% of the thickness between a peripheral external surface and a peripheral internal surface, such as thickness $T_2$ in FIG. 32B. Further, the thickness of the internal stress region in the central portion of the glass article may be referenced to the thickness of the central portion. In embodiments, the thickness of the internal tensile stress region in the central region is at least 10%, 20%, or 30% of the thickness between a central external surface and a central internal surface, such as thickness $T_1$ in FIG. 32B.

FIG. 32B illustrates a cross-section view of an example glass article having a compressive stress layer 3230 extending around the glass article and an internal region of central tension 3240. For the glass article 3200 shown in FIG. 32B, the compressive stress layer 3230 has a first depth ($DoL_1$) extending from central exterior surface 3202a and from peripheral exterior surface 3202b. The compressive stress layer 3230 has a second depth ($DoL_2$) extending from the side surface 3208, a third depth ($DoL_3$) extending from peripheral interior surface 3204c, and a fourth depth ($DoL_4$) extending from central interior surface 3204a.

As shown in FIG. 32B, each of the depths DoL1-DoL4 are different from one another, indicating that the glass article has been asymmetrically chemically strengthened. Put another way, the DoL varies in different portions of the glass article and/or as measured from different surfaces of the glass article. Accordingly, the thicker peripheral portion 3225 has a deeper DoL along the interior surface of the glass article than does the thinner central portion 3220. Likewise, a region of the compressive stress layer 3230 extending from the central exterior surface 3202a is thicker than a region of the compressive stress layer 3230 extending from central interior surface 3204a (at the backside of the article 3200), but thinner than regions of the layer 3230 defined in the peripheral portion 3225.

In some aspects of the invention, the compressive stress layer may be described as comprising multiple regions. Each region of the compressive stress layer (i.e., compressive stress region) may be associated with one or more surfaces of the glass article. For example, the glass article of FIG. 32B may be described as having a first compressive stress region 3331 along central exterior surface 3202a and peripheral exterior surface 3202b, a second compressive stress region 3332 along side surface 3208, a third compressive stress region 3333 along peripheral interior surface 3204c, and a fourth compressive stress region 3334 along central interior surface 3204a. Each compressive stress region has a depth of layer (DoL) and a compressive surface stress (CS).

FIG. 32C illustrates a cross-section view of another example glass article having a compressive stress layer 3230 extending around the glass article and an internal region of central tension 3240. For the glass article 3200 shown in FIG. 32C, the compressive stress layer 3230 has a first depth ($DoL_1$) extending from central exterior surface 3202a and a second depth ($DoL_2$) extending from peripheral exterior surface 3202b and side surface 3208. The second depth is thicker than the first depth. Accordingly, the thicker peripheral portion 3225 has a deeper DoL along the exterior surface of the glass article than does the thinner central portion 3220. As shown in FIG. 32C, the compressive stress layer 3230 includes first compressive stress region 3231 extending from central exterior surface 3202a and second compressive stress region 3232 extending from peripheral exterior surface 3202b and side surface 3208.

The compressive stress layer 3230 has a third depth ($DoL_3$) extending from central interior surface 3204a, transitional interior surface 3204b, and peripheral interior surface 3204c. As shown, the third depth is thinner than each of the first and the second depth. For example, the third depth may be from 25% to 75% of the first depth. In embodiments, the compressive stress layer along the interior surface of the glass article has a relatively high compressive surface stress even though the depth of the layer is relatively small. By the way of example, the compressive surface stress may be at least 75% of the compressive surface stress at peripheral exterior surface 3202b. As another example, the compressive surface stress of the compressive stress layer along the interior surface of the glass article may be greater than or equal to the compressive surface stress at peripheral exterior surface 3202b. In some embodiments, the surface compressive stress along an interior surface of the glass article may be from 600 MPa to 800 MPa and the surface compressive stress along a peripheral exterior surface may be from 300 MPa to less than 600 MPa. The region of the compressive stress layer extending from central interior surface 3204a, transitional interior surface 3204b, and peripheral interior surface 3204c is labelled as third compressive stress region 3233 in FIG. 32C.

Figure 33A:
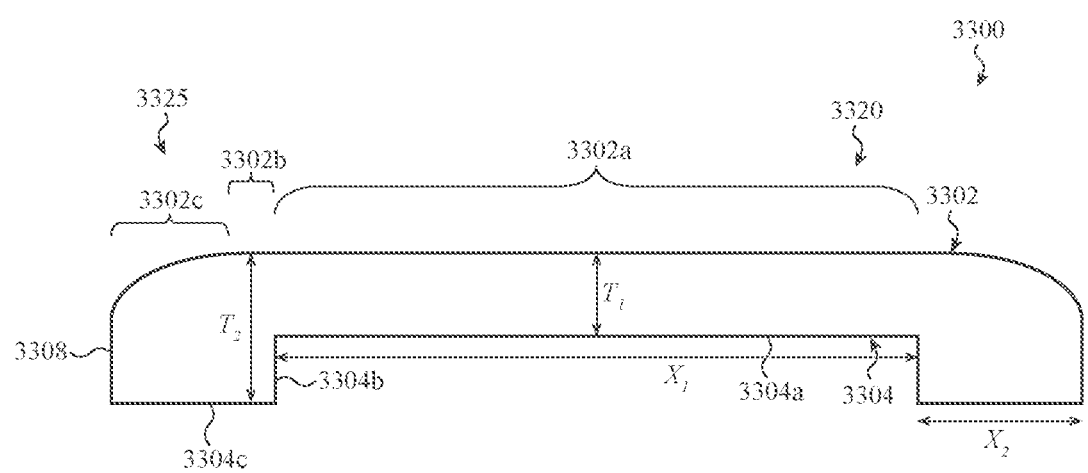
FIG. 33A is a simplified cross-section view of another glass article having a central portion which is thinner than a peripheral portion.

FIG. 33A is a cross-sectional view of another example glass article. As shown, the glass article 3300 includes a thicker peripheral portion 3325 and thinner central portion 3320. The exterior surface of peripheral portion 3325 comprises a first peripheral exterior surface 3302b, which is generally flat, and as second peripheral exterior surface 3302c, which is curved. As shown, the thickness of peripheral portion 3325 varies, but at least some sections of peripheral portion have a thickness greater than the thickness $T_1$ of the central portion 3320.

One measure of the thickness in the peripheral portion is the distance from peripheral interior surface 3304c to first peripheral exterior surface 3302b along a perpendicular to peripheral interior surface 3304c, labeled as $T_2$ in FIG. 33A. A measure of the lateral thickness in the peripheral portion is a distance between transitional interior surface 3304b to side surface 3308 along a perpendicular to transitional interior surface 3304b, labeled as $X_2$ in FIG. 33A. Each of $X_2$ and $T_2$ may be greater than thickness $T_1$, as shown in FIG. 33A. When the glass article has a generally planar exterior region as shown in FIG. 33A, an axis aligned with the generally planar exterior region may be referred to as a horizontal axis. In this case, $X_2$ may be referred to as a thickness in a horizontal direction and $T_2$ may be referred to as a thickness in a vertical direction.

The curve defined by the second peripheral exterior surface 3302c may span a substantial fraction of a thickness of the peripheral region. As examples, the horizontal distance spanned by the curve may be at least 30%, 40%, or 50% of distance $X_2$. In addition, the vertical distance spanned by the curve may be at least 20%, 30%, or 40% of distance $T_2$. As shown in FIG. 33A, the second peripheral exterior surface 3302c may adjoin side surface 3308. Alternately, the second peripheral exterior surface 3302 may adjoin peripheral interior surface 3304c.

As shown, the peripheral portion 3325 steps down (e.g., transitions in thickness) to the central portion 3220, with the transition in thickness being along the interior surface of the glass article. The interior surface of the article includes central interior surface 3304a in the central portion, peripheral interior surface 3304c in the peripheral portion, and transitional interior surface 3304b at a transition in thickness between the central portion and the peripheral portion. Central exterior surface 3302a is generally opposite central interior surface 3304a.

Figure 33B:
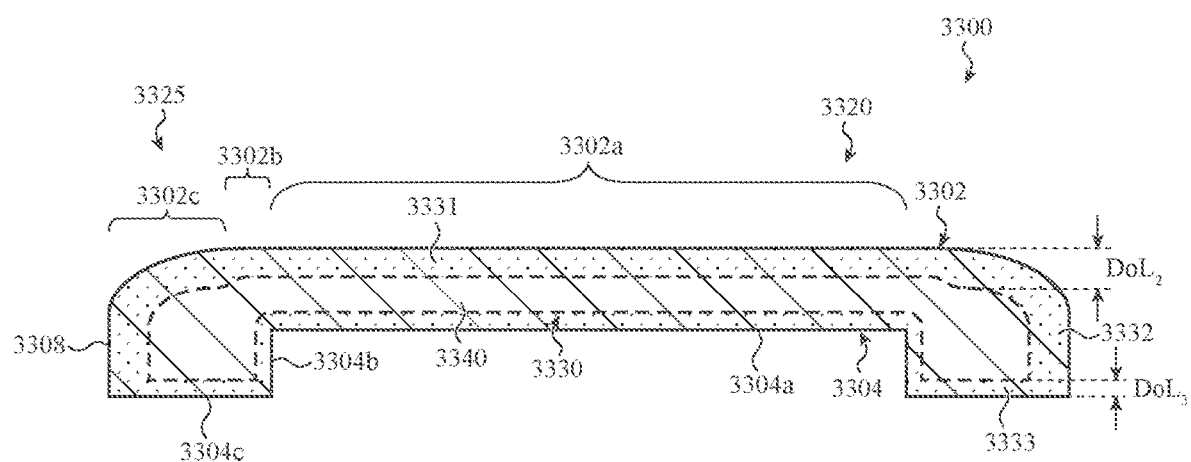
FIG. 33B illustrates an example of compressive stress regions formed in the central portion and the peripheral portion of the glass article of FIG. 33A.

FIG. 33B shows another cross-section view of the glass article of FIG. 33A. As shown in FIG. 33B, the glass article has a compressive stress layer 3330 extending around the glass article and an internal region of central tension 3340. The compressive stress layer 3330 extends from central exterior surface 3302a to a first depth ($DoL_1$). The depth of the compressive stress layer 3330 extending from first peripheral exterior surface 3302b transitions from the first depth to a second depth ($DoL_2$) which is greater than the first depth. In embodiments, the compressive stress layer 3330 extends from curved second peripheral exterior surface 3302c to the second depth. The deeper compressive stress layer serves to protect the curved peripheral exterior surface from damage.

The compressive stress layer 3330 has a third depth ($DoL_3$) extending from central interior surface 3304a, transitional interior surface 3304b, and peripheral interior surface 3304c. As shown, the third depth is thinner than each of the first and the second depth. For example, the third depth may be from 25% to 75% of the first depth. In embodiments, the compressive stress layer along the interior surface of the glass article has a relatively high compressive surface stress even though the depth of the layer is relatively small. By the way of example, the compressive surface stress may be at least 75% of the compressive surface stress at peripheral exterior surface 3302b. As another example, the compressive surface stress of the compressive stress layer along the interior surface of the glass article may be greater than or equal to the compressive surface stress at peripheral exterior surface 3302b. In some embodiments, the surface compressive stress along an interior surface of the glass article may be from 600 MPa to 800 MPa and the surface compressive stress along a peripheral exterior surface may be from 300 MPa to less than 600 MPa. FIG. 33B also labels different regions of the compressive stress layer including first compressive stress region 3331 extending from central peripheral surface 3302a, second compressive stress region 3332 extending from second peripheral exterior surface 3302c, and third compressive stress region 3333 extending from peripheral interior surface 3304c, transitional interior surface 3304b, and central interior surface 3304a.

Figure 34A:
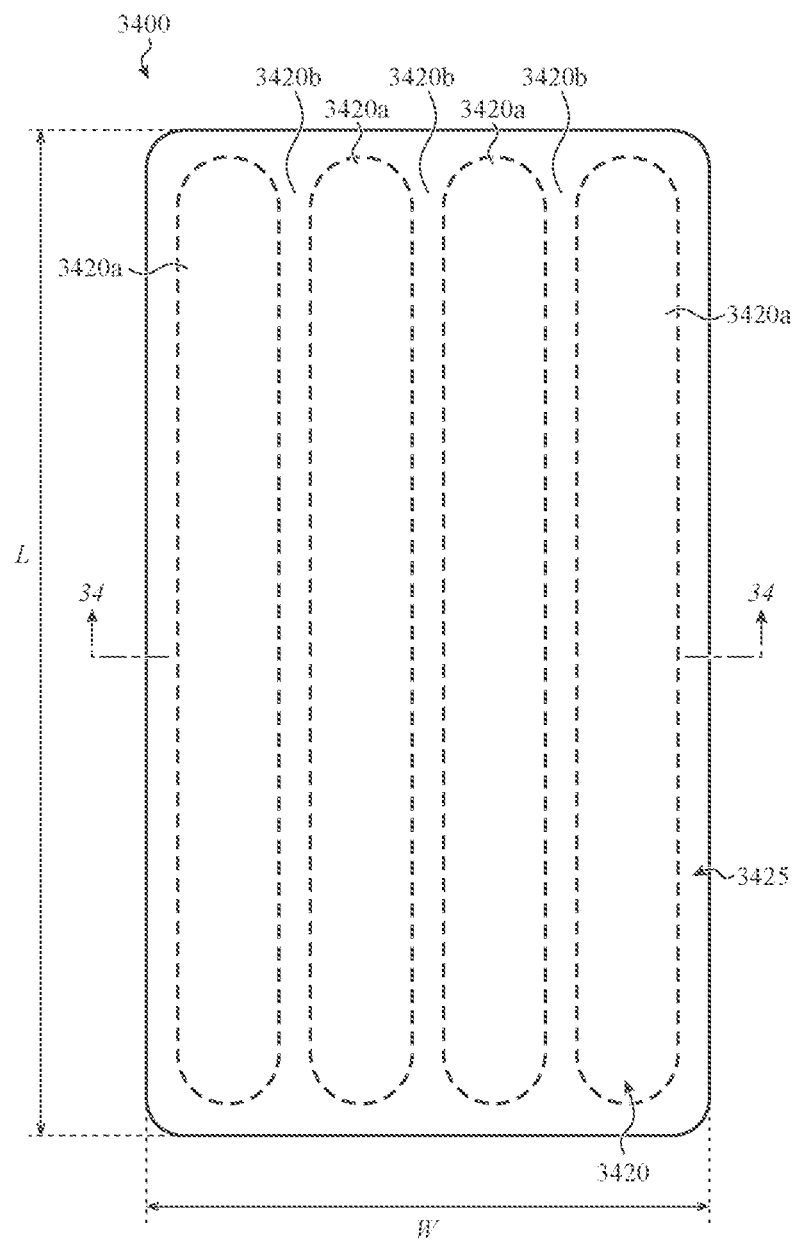
FIGS. 34A and 34B show views of a second sample glass article having portions of different thickness and an asymmetrically chemically strengthened layer that changes depth.
Figure 34B:
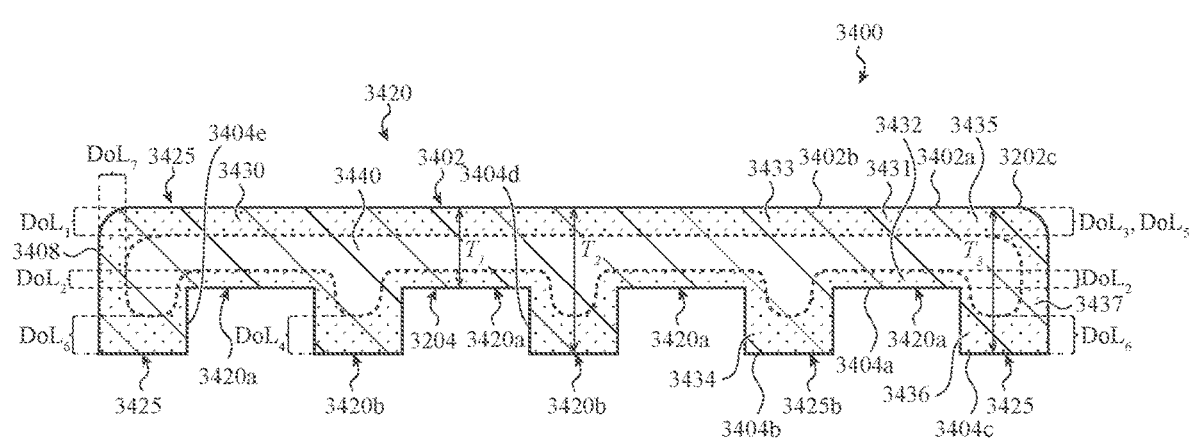

FIGS. 34A-34B illustrate another example embodiment of a glass article 3400. This glass article 3400 is suitable for any use as described herein and specifically including those discussed with respect to FIG. 31. As with the glass article 3100 shown in FIG. 31, the glass article 3400 includes a peripheral portion 3425 and a central portion 3420. The central portion includes thinner portions (first portions 3420a) and thicker portions (second portions 3420b). The thicker portions define at least one rib feature. The peripheral portion 3425 is also thicker than portions 3420a, the thicknesses are illustrated in the cross-section view of FIG. 34B. Therefore, the thicker portions of the glass article include the peripheral portion 3425 as well as portions 3420b of the central region.

As illustrated in the top view of FIG. 34A, portions 3420b of the central region may be viewed as forming a series of rib features. The rib features 3420b of FIG. 34A are contiguous with peripheral portion 3425a. Rib features 3420b extend to the peripheral portion 3425a and, as shown, span the central zone of the glass article. The multiple thinner portions 3420a are defined by thicker peripheral portion 3425 and thicker portions 3420b. Each of the thinner portions 3420a may be viewed as forming island features, each of which are separated from one another by a thicker portion 3420b.

FIG. 34B illustrates a cross-sectional view of the glass article 3400, taken along line 34-34 of FIG. 34A. As shown in FIG. 34B, the central portion includes thinner portions 3420a and thicker portion 3420b. The peripheral portion 3425 is also thicker than portions 3420a. In some embodiments, a thickness of peripheral portion 3425 is about the same as a thickness of portions 3420a.

Also similar to glass article 3100, the DoL of the asymmetrically chemically strengthened compressive stress layer 3430 is deeper at thicker portions (e.g., portions 3420b and 3425) and is shallower at thinner portions (such as portions 3420a). Likewise the DoL may be different at front and rear surfaces of the same portion of the glass article 3400 or as the layer extends inward from a side surface 3408. It should be appreciated, then, that multiple thinned and/or thickened portions may each exist in a single glass article and the DoL of an asymmetrically chemically strengthened layer may be different as between any or all such portions or regions.

As shown in FIG. 34B, the central zone comprises a first portion 3420a having a first thickness $T_1$ and a second portion 3425b having a second thickness $T_2$ greater than the first thickness $T_1$. As shown, the first portion 3420a comprises a first front surface 3402a and a first rear surface 3404a and the second portion comprises a second front surface 3402b and a second rear surface 3404b. Further, the second portion comprises wall surface 3404d which adjoins the first rear surface 3404a and the second rear surface 3404b. Alternately, the wall surface 3404d may be referred to as a transitional surface as it provides a transition between first rear surface 3404a and the second rear surface 3404b.

The first portion further comprises a first compressive stress region 3431 having a first depth $DoL_1$ along the first front surface; and a second compressive stress region 3432 having a second depth $DoL_2$, less than the first depth, along the first rear surface. The second portion 3420b comprises a third compressive stress region 3433 having a third depth $DoL_3$ along the second front surface. The second portion further comprises a fourth compressive stress region 3434 having a fourth depth $DoL_4$ along the second rear surface 3404b.

The peripheral zone 3425 has a third thickness $T_3$, which is shown as substantially equal to second thickness $T_2$. The peripheral zone 3425 comprises a third front surface 3402c and a third rear surface 3404c. The peripheral zone 3425 further comprises wall surface 3404e. As shown, the wall surface 3404 adjoins and provides a transition between third rear surface 3404c and first rear surface 3402a. In further embodiments, the thickness $T_3$ may be greater than the second thickness $T_2$.

As shown, the peripheral zone 3425 further comprises a fifth compressive stress region 3435 having a fifth depth $DoL_5$ along the third front surface 3402c; and a sixth compressive stress region 3436 having a sixth depth $DoL_6$ along the third rear surface 3406c. As shown in FIG. 34C, each of the third depth $DoL_3$ and the fifth depth $DoL_5$ are substantially equal to the first depth $DoL_1$. However, this is not limiting and the third depth and/or the fifth depth may be different from the first depth. For example, the fifth depth may be greater than the first depth.

As shown in FIG. 34B, the peripheral zone 3425 further comprises a side surface 3408 and a seventh compressive stress region 3437 having a seventh depth $DoL_7$ along the side surface. As shown, the seventh depth is substantially equal to the first depth, but this is not limiting. In some embodiments, the seventh depth may be greater than the first depth.

Likewise, locally thinned or thickened portion of the glass article can define islands, protrusions, bosses, steps, plateaus, undercuts, or any other structural feature. A glass article may be asymmetrically chemically strengthened to different depths of layer in any or all such structural features, as described herein. Likewise, thicker regions or portions of a glass article need not surround thinner regions or portion, nor are thicker regions/portions necessarily at one or more edges of a glass article. Any relative positioning, size, shape, and/or dimension of thicker and thinner portions or regions is contemplated.

It should be appreciated that asymmetric chemical strengthening, including asymmetric chemical strengthening in which the DoL is deeper in at least some thicker portions of a glass article than it is in thinner portions, may be created by selectively masking certain sections, performing multiple chemical strengthening operations in certain sections, discretely treating certain sections, or otherwise through any operation or method disclosed herein.

For example, an ion exchange along an external and an internal surface of the glass article may be used to form an asymmetric compressive stress layer. An example compressive stress layer for a glass article comprising a thicker peripheral portion and a thinner central portion comprises a first compressive stress region having a first depth along the external surface in a central portion of the glass article and a second compressive stress region having a second depth, less than the first depth, along the internal surface in the central portion of the glass article. The compressive layer further comprises a third compressive stress region having a third depth, greater than the first depth, along the external surface in a peripheral portion of the glass article and a fourth compressive stress region having a fourth depth, less than the third depth, along the internal surface in the peripheral portion of the article.

In aspects of the disclosure, multiple ion exchanges are used to form the compressive stress layer. The ion exchanges (alternately, ion exchange operations) may involve immersing the glass article in one or more baths comprising an ion to be exchanged for a smaller ion in the glass article. For example, the glass article may comprise sodium ions and the bath may comprise potassium ions as previously described.

Baths used in the multiple ion exchanges may differ in bath composition and/or bath temperature. When it is desired to form a region of the compressive stress layer having a relatively shallow depth and a relatively high compressive stress layer, the bath may have a concentration of the ion to be exchanged which is greater than that of other baths used in other ion exchange operations. In addition, the glass article may be immersed for a shorter time than used in other ion exchange operations.

The bath may comprise one or more salts including the ions to be introduced into the glass; generally, the one or more salts at least partially dissociate into anionic and cationic components in the bath. In embodiments, the bath comprises a solution including the ions to be introduced into the glass. In additional embodiments, the bath may consist essentially of the salt, so that the concentration of the salt in the bath is about 100%. The bath may be at a temperature where the one or more salts are molten.

In embodiments, the operation of forming a compressive stress layer having regions of different depths includes at least one operation of applying a mask to the glass article. In embodiments, masking techniques may be used to form each region of compressive stress separately, so that the number of ion exchange operations is at least equal to the number of compressive stress regions. For example, to form a first region of compressive stress along a first surface of the glass article, a first mask may be applied to the other surfaces of the glass article, leaving the first surface unmasked. To form the second region of compressive stress along a second surface of the glass article, the first mask may be removed at least from the second surface of the glass article and a second mask applied to at least the first surface of the glass article, and so forth. In further embodiments, at least one region of compressive stress is formed as a result of multiple ion exchange operations.

An example of a method including an operation of forming a compressive stress layer comprising the first, second, third and fourth compressive stress regions is described as follows. The method includes applying a mask to shield the internal surfaces of the glass article and the external surface in the central portion of the glass article. For example, the mask may be applied to the central interior surface, the central exterior surface, and the peripheral interior surface. After applying the mask, the method further includes performing a first ion exchange along the external surface of the peripheral portion of the glass article to create the third compressive stress region along the external surface of the peripheral portion.

After the first ion exchange, the example further comprises removing the mask from the external surface of the central portion and performing a second ion exchange along the external surface of the glass article to create the first compressive stress region along the external surface of the central portion and to increase a depth of the third compressive stress region along the external surface of the peripheral portion. After removing the mask from the internal surface of the glass article; the operation further comprises performing a third ion exchange along the internal surface and the external surface of the glass article.

In embodiments, the third ion exchange creates the second compressive stress region having the second depth and the fourth compressive stress region having the fourth depth along the internal surface. The third ion exchange also increases a depth of the first compressive stress region to the first depth greater than the second depth and the fourth depth and increases the depth of the third compressive stress region to the third depth greater than the first depth. The second depth and the fourth depth may be about the same.

In additional embodiments, the mask is a first mask and the method further comprises applying a second mask to the external surface of the central portion and to the external surface of the peripheral portion prior to performing the third ion exchange. The third ion exchange creates the second compressive stress region having the second depth and the fourth compressive stress region having the fourth depth along the internal surface. If the second mask substantially blocks ion exchange of the external surface of the central portion and to the external surface of the peripheral portion, the second ion exchange creates the first compressive stress region having a first depth and increases a depth of the third compressive stress region to the third depth.

As used herein, the terms "about", "approximately," and "substantially equal to" are used to account for relatively small variations, such as a variation of +/−10%, +/−5%, or +/−2%.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A glass article for an electronic device, the glass article comprising:
   a peripheral zone having a first thickness and defining a side surface and peripheral exterior and interior surfaces of the glass article;
   a central zone having a second thickness less than the first thickness and defining central exterior and interior surfaces of the glass article;
   a first compressive stress region extending from the side surface to a first depth;
   a second compressive stress region extending from the central exterior surface and at least a portion of the peripheral exterior surface to a second depth less than the first depth; and
   a third compressive stress region extending from the peripheral interior surface to a third depth greater than the first depth.

2. The glass article of claim 1, wherein:
   the glass article further comprises a fourth compressive stress region extending from the central interior surface to a fourth depth; and
   the second depth is greater than the fourth depth.

3. The glass article of claim 1, wherein a compressive surface stress of the first compressive stress region is different than a compressive surface stress of the second compressive stress region.

4. The glass article of claim 1, wherein the peripheral interior surface protrudes from the central interior surface.

5. The glass article of claim 1, wherein the second thickness is at least 20% of the first thickness.

6. The glass article of claim 1, where a lateral dimension of the peripheral zone is greater than the second thickness.

7. The glass article of claim 1, wherein the glass article forms part of a display area of the electronic device.

8. A glass article for an electronic device, the glass article comprising:
   a first zone defining a first thickness, a first exterior surface, a first interior surface, and a side surface;
   a second zone defining a second thickness that is less than the first thickness, a second exterior surface, and a second interior surface, the first zone at least partially surrounding the second zone;
   a first compressive stress region extending from the side surface to a first depth; and
   a second compressive stress region extending from the second exterior surface and at least a portion of the first exterior surface to a second depth less than the first depth.

9. The glass article of claim 8, further comprising a third compressive stress region extending from the first interior surface of the glass article to a third depth, wherein:
   the third depth is different than the first depth; and
   the third compressive stress region has a compressive surface stress different from a compressive surface stress of the first compressive stress region.

10. The glass article of claim 9, wherein the third depth is greater than the first depth.

11. The glass article of claim 9, further comprising a fourth compressive stress region extending from the second interior surface to a fourth depth less than the second depth.

12. The glass article of claim 11, wherein the second zone comprises:
   a first portion having the second thickness and defining the second interior surface; and
   a second portion having a thickness greater than the second thickness and protruding with respect to the second interior surface.

13. The glass article of claim 12, wherein:
   the second portion further defines a third interior surface; and
   the glass article further comprises a fifth compressive stress region extending from the third interior surface to a fifth depth greater than the fourth depth.

14. The glass article of claim 8, further comprising a third compressive stress region extending from the first interior surface of the glass article to a third depth about equal to the first depth.

15. A glass article for an electronic device, the glass article comprising:
- a first portion having a first thickness;
- a second portion having a second thickness greater than the first thickness, contiguous with the first portion, and offset from a side surface of the glass article;
- a first compressive stress region extending along an exterior surface of each of the first portion and the second portion and having a first depth;
- a second compressive stress region extending along an interior surface of the first portion and having a second depth; and
- a third compressive stress region extending along an interior surface of the second portion and having a third depth greater than the second depth.

16. The glass article of claim 15, wherein the second portion defines an interior rib feature.

17. The glass article of claim 15, wherein the first depth is greater than the second depth.

18. The glass article of claim 15, wherein the third depth is less than the first depth.

19. The glass article of claim 15, wherein the glass article further comprises a third portion defining at least a portion of the side surface of the glass article and having a third thickness greater than the first thickness.

20. The glass article of claim 19, wherein:
- the first compressive stress region extends along an exterior surface of the third portion; and
- a fourth compressive stress region extends along an interior surface of the third portion and has a fourth depth greater than the second depth.

* * * * *